United States Patent
Demsey

(10) Patent No.: US 11,232,488 B2
(45) Date of Patent: Jan. 25, 2022

(54) SYSTEM, DEVICES AND METHODS FOR IDENTIFYING MOBILE DEVICES AND OTHER COMPUTER DEVICES

(71) Applicant: NextRoll, Inc., San Francisco, CA (US)

(72) Inventor: Seth Demsey, Vienna, VA (US)

(73) Assignee: NextRoll, Inc., San Francisco, CA (US)

( * ) Notice: Subject to any disclaimer, the term of this patent is extended or adjusted under 35 U.S.C. 154(b) by 0 days.

(21) Appl. No.: 16/101,279

(22) Filed: Aug. 10, 2018

(65) Prior Publication Data

US 2019/0050910 A1 Feb. 14, 2019

Related U.S. Application Data

(60) Provisional application No. 62/590,078, filed on Nov. 22, 2017, provisional application No. 62/543,702, filed on Aug. 10, 2017.

(51) Int. Cl.
| | |
|---|---|
| *G06Q 30/02* | (2012.01) |
| *H02J 9/00* | (2006.01) |
| *H04L 27/00* | (2006.01) |
| *H04W 4/23* | (2018.01) |
| *H04L 29/08* | (2006.01) |

(52) U.S. Cl.
CPC ..... *G06Q 30/0269* (2013.01); *G06Q 30/0267* (2013.01); *G06Q 30/0277* (2013.01); *H02J 9/00* (2013.01); *H04L 27/00* (2013.01); *H04L 67/02* (2013.01); *H04W 4/23* (2018.02)

(58) Field of Classification Search
CPC ............ G06Q 30/0207–30/0277; G06Q 30/02
USPC .............................................. 705/14.1–14.73
See application file for complete search history.

(56) References Cited

U.S. PATENT DOCUMENTS

| | | | |
|---|---|---|---|
| 8,438,184 B1 | 5/2013 | Wang et al. | |
| 9,319,379 B1 | 4/2016 | Burcham et al. | |
| 9,756,020 B2 | 9/2017 | Kaufman | |
| 10,091,312 B1 * | 10/2018 | Khanwalkar | H04L 67/22 |
| 10,453,092 B1 * | 10/2019 | Wang | G06Q 30/0277 |
| 2003/0070067 A1 | 4/2003 | Saito | |
| 2004/0133675 A1 | 7/2004 | Ishiyama et al. | |
| 2006/0100928 A1 | 5/2006 | Walczak, Jr. et al. | |
| 2006/0112176 A1 | 5/2006 | Liu et al. | |
| 2008/0304482 A1 | 12/2008 | Grassi et al. | |
| 2011/0289185 A1 | 11/2011 | Herder et al. | |
| 2011/0321167 A1 | 12/2011 | Wu et al. | |
| 2012/0113959 A1 | 5/2012 | Sugizaki et al. | |
| 2012/0265599 A1 | 10/2012 | Corner et al. | |
| 2013/0124309 A1 * | 5/2013 | Traasdahl | H04L 67/22 705/14.49 |

(Continued)

*Primary Examiner* — Vincent M Cao

(74) *Attorney, Agent, or Firm* — Muir Patent Law, PLLC

(57) ABSTRACT

Improved identification of a computer configured with an operating system (OS), a web browser and one or more applications is disclosed. An identifying code for advertisers (IFA) may be obtained via the operating system (OS) of the computer. A first application configuring the computer may include instructions to initiate an ad call comprising a request including the IFA to cause the first application to render an advertisement received by the computing device from a first web resource in response to the ad call. The web browser may execute the script to configure the web browser with a durable id (DID). The web browser may also communicate the DID to associate the IFA with the computing device.

19 Claims, 10 Drawing Sheets

(56) References Cited

U.S. PATENT DOCUMENTS

| | | |
|---|---|---|
| 2013/0238425 A1* | 9/2013 | Saldanha ............... G06Q 30/02 |
| | | 705/14.48 |
| 2013/0273879 A1 | 10/2013 | Eisen et al. |
| 2013/0275570 A1 | 10/2013 | Treuhaft et al. |
| 2013/0304604 A1 | 11/2013 | Hoffman et al. |
| 2014/0207566 A1 | 7/2014 | Kamran et al. |
| 2015/0095957 A1 | 4/2015 | Ravi |
| 2015/0334158 A1 | 11/2015 | Ravi |
| 2015/0334172 A1 | 11/2015 | Ravi |
| 2016/0036943 A1 | 2/2016 | Kish et al. |
| 2016/0050167 A1* | 2/2016 | Ramachandran .. G06Q 30/0242 |
| | | 709/204 |
| 2016/0269497 A1 | 9/2016 | Glommen et al. |
| 2016/0364498 A1 | 12/2016 | Greene et al. |
| 2016/0381161 A1 | 12/2016 | Matsumura |
| 2017/0064032 A1 | 3/2017 | Ulrich et al. |
| 2017/0085412 A1 | 3/2017 | Greene |
| 2017/0085522 A1 | 3/2017 | Greene |
| 2017/0093759 A1 | 3/2017 | Wistow |
| 2017/0180497 A1* | 6/2017 | Comstock .......... G06Q 30/0201 |
| 2018/0025086 A1* | 1/2018 | Malkin ................. G06Q 30/02 |
| | | 707/710 |
| 2018/0048564 A1 | 2/2018 | Bianco et al. |
| 2018/0241716 A1 | 8/2018 | Roberts et al. |
| 2018/0375953 A1 | 12/2018 | Casassa Mont et al. |

\* cited by examiner

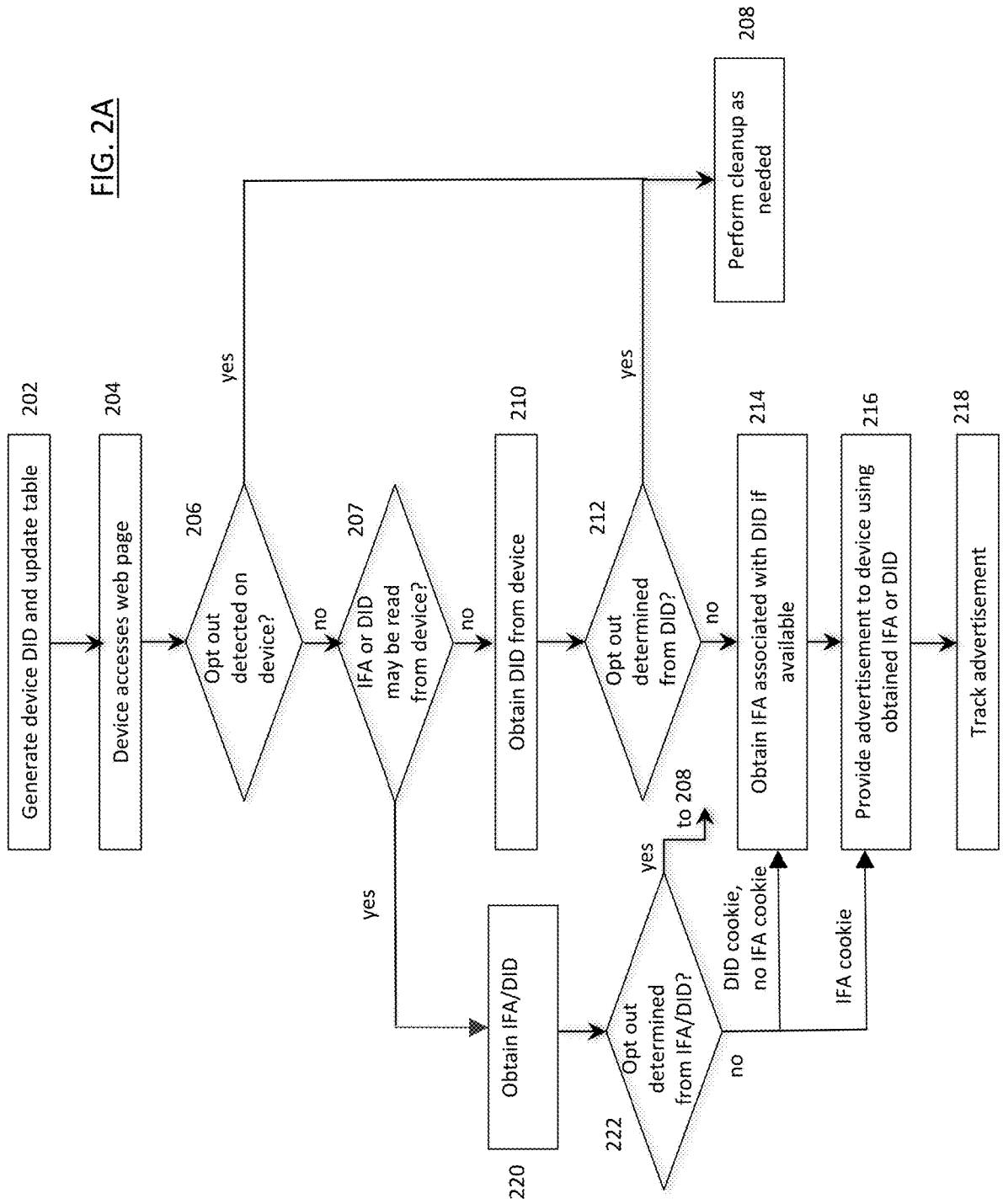

154a

| Vendor ID | Ad ID | Date | Time | Device IFA | Device DID |
|---|---|---|---|---|---|
| 1234 | 55A5 | 06-08-2016 | 7:32 PM | 9876 | 7654 |
| 1234 | 55A5 | 06-11-2016 | 12:05 PM | 1212 | 0324 |
| 1234 | 4590 | 06-18-2016 | 5:45 PM | 9876 | 7654 |
| F2D7 | 2C98 | 06-06-2016 | 7:01 AM | 44FE | 0042 |
| 1D08 | 55A5 | 06-30-2016 | 11:03 PM | | AB99 |
| ... | ... | ... | ... | ... | ... |

| Device IFA | Device DID | Opt-out flag |
|---|---|---|
| 9876 | 7654 | 0 |
| 1212 | 0324 | 0 |
| 7D7D | 0000 | 1 |
| 44FE | 0042 | 0 |
| 2323 | 0000 | 1 |
| | AB99 | 0 |
| ... | ... | ... |

FIG. 2C

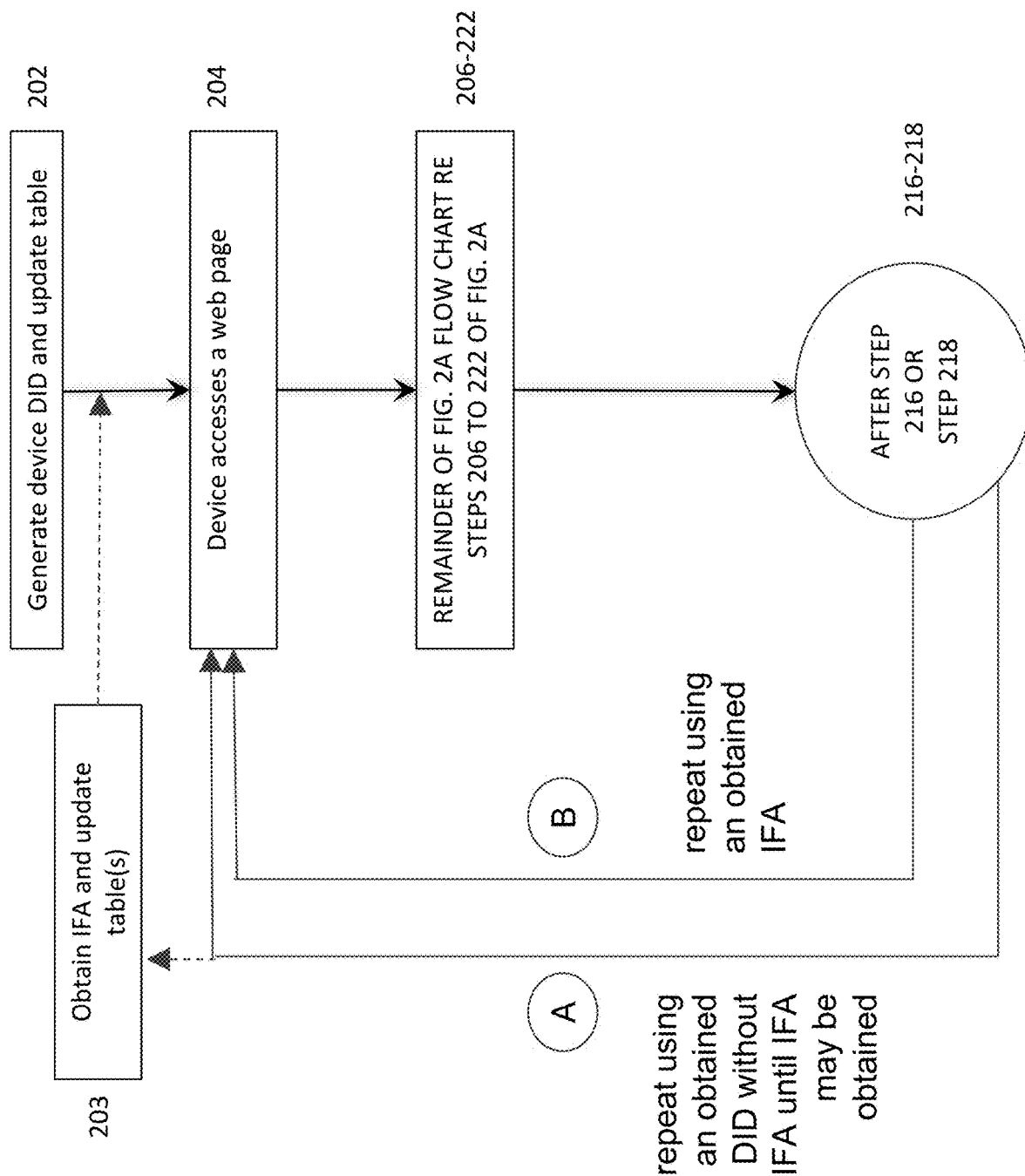

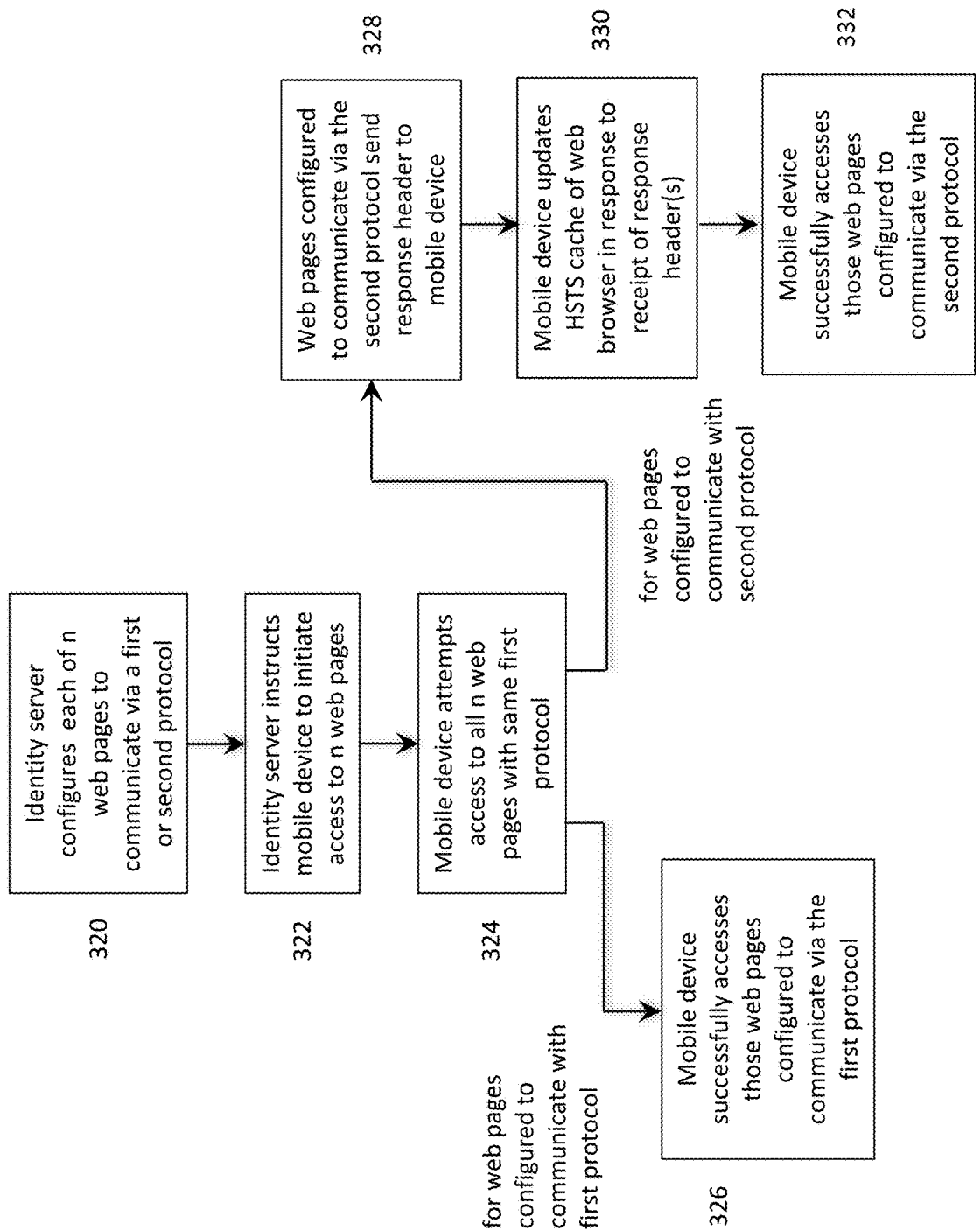

FIG. 3D

| bit # | DID bit | Initial HTTP protocol and web page | HSTS? | Change protocol to HTTPS? |
|---|---|---|---|---|
| 0 | 1 | http://www.b0.identify.com/img.jpg | Y | Y => https://www.b0.identify.com/img.jpg |
| 1 | 0 | http://www.b1.identify.com/img.jpg | N | No |
| 2 | 1 | http://www.b2.identify.com/img.jpg | Y | Y => https://www.b2.identify.com/img.jpg |
| 3 | 0 | http://www.b3.identify.com/img.jpg | N | No |
| ... | ... | ... | ... | ... |
| 15 | 0 | http://www.b15.identify.com/img.jpg<br>DID code = 0x0325 | Y | Y => https://www.b15.identify.com/img.jpg |

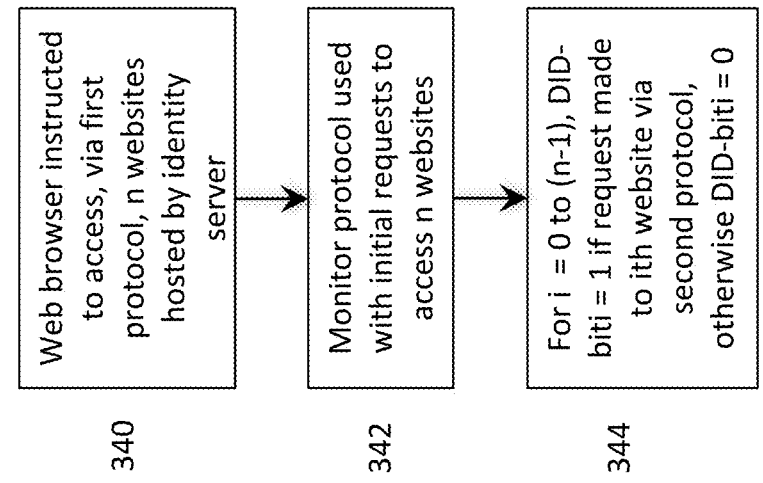

SYSTEM, DEVICES AND METHODS FOR IDENTIFYING MOBILE DEVICES AND OTHER COMPUTER DEVICES

RELATED APPLICATIONS

This application claims priority to provisional application No. 62/543,702 filed Aug. 10, 2017 and to provisional application No. 62/590,078, the entire contents of each of these applications herein being incorporated by reference.

BACKGROUND

The present disclosure is directed toward a system and method of identifying mobile devices, such as cell phones, and other computer devices that communicate over a network.

It is often desirable for websites or other web resources to be able to identify a computing device requesting access to the website. Identification of the computing device by the website may be used for a variety of purposes, such as maintaining user specific data (e.g., associating shopping cart contents with the computing device), web advertisement selection, fraud detection, etc.

However, consistent and secure identification of an accessing computing device can be difficult. For example, when separate applications on the same computing device are used to access a web resource, the web resource may not be able to identify that these accesses are by the same computing device. Even though these applications may operate in conjunction with the same operating system of the computing device, full resources of such operating system may not be made available to applications. Further, the variety of applications provided on a variety of computing devices configured by a variety of different operating systems make industry coordination of computing device identification difficult. A simplified system for identification of a computing device requesting access to a web resource that may avoid modification of existing operating systems would be beneficial.

SUMMARY

Methods, computers, networks and computer readable media are disclosed herein for providing improved identification of a computing device. In some examples, a computer may be configured with an operating system (OS), a web browser and one or more applications. An identifying code for advertisers (IFA) may be obtained via the operating system (OS). A first application configuring the computer may include instructions to initiate an ad call comprising a request including the IFA to cause the first application to render an advertisement received by the computing device from a first web resource in response to the ad call. The web browser may execute the script to configure the web browser with a durable id (DID). The web browser may also communicate the DID to associate the IFA with the computing device.

The script may be obtained via the web browser accessing a second web resource or may be provided as part of the first application.

The script may cause the web browser to access a series of web resources which may cause the web browser to be configured with the DID.

The web browser application may be unable to obtain the IFA via requests to the OS or otherwise access to the IFA as stored by the OS within the computer.

The computer may be a mobile device, and communications with the first web resource and the second web resource by the computer may include wireless communications using a radio of the mobile device.

BRIEF DESCRIPTION OF THE DRAWINGS

Further details and features of the invention may be appreciated by reference to the disclosed exemplary embodiments of the invention set forth in the following detailed description and the accompanying drawings in which:

FIG. 2A illustrates an example method according to an embodiment. FIG. 2D illustrates an exemplary implementation of repetitively performing the method of FIG. 2A. FIG. 2B illustrates an exemplary ad tracking table and FIG. 2C illustrates an exemplary look-up table;

FIGS. 3A, 3B, 3C, 3E, 4A and 4B illustrate exemplary details that may be performed as part of the method of FIG. 2A/2D. FIG. 3D illustrates the association of bits of an exemplary identification code with HTTP protocols.

DETAILED DESCRIPTION

Figure 1:
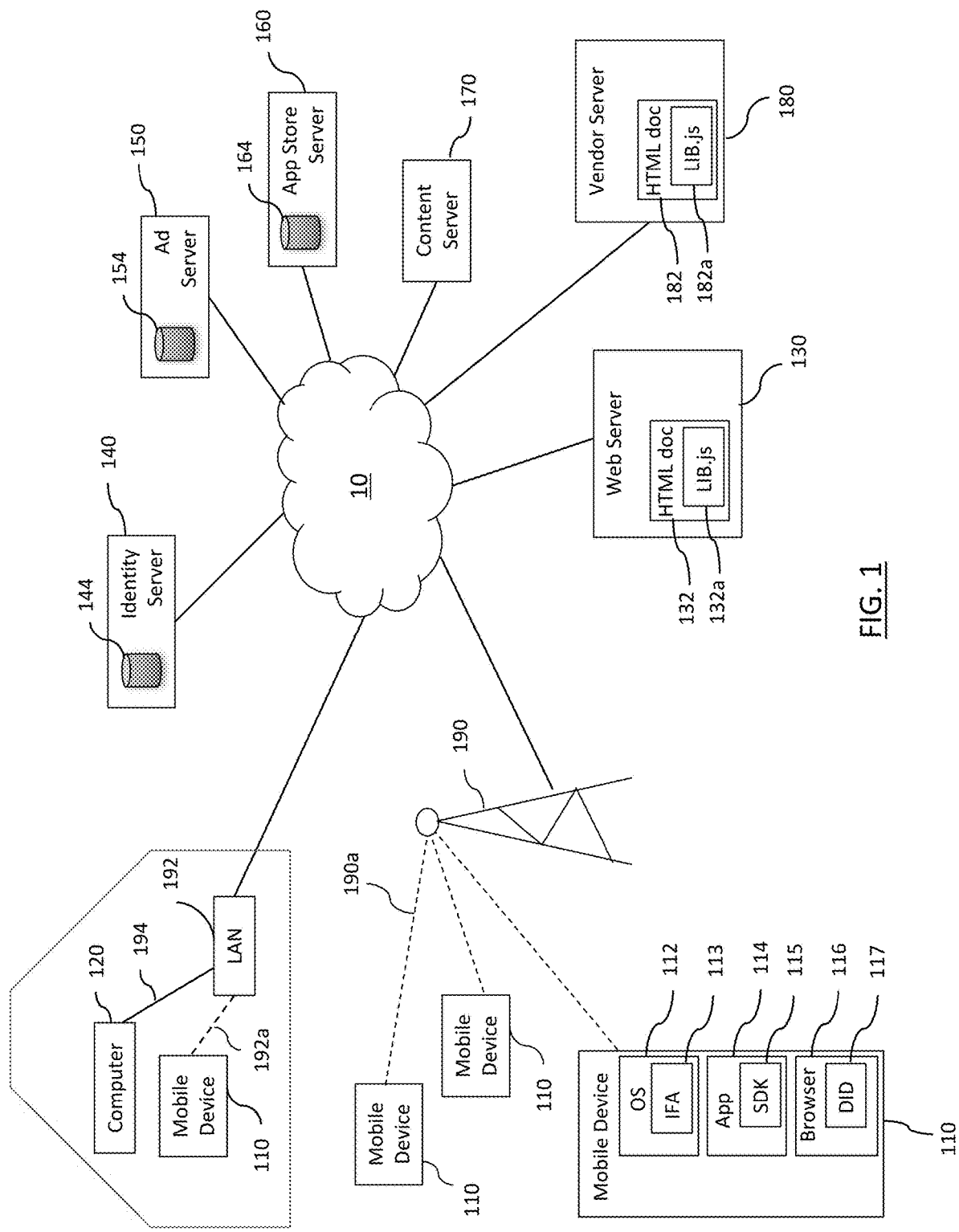
FIG. 1 depicts a system for implementing identification of a mobile device and other computer devices.

The present disclosure will now be described more fully with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The terminology used herein is for the purpose of describing particular embodiments only and is not intended to limit the scope of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

It will be further understood that all transitional terms (e.g., "comprises," "includes," "having," etc.) except "consisting of" and "essentially consisting of" are open ended and allow for the presence of additional structure or steps.

The computer may comprise a processor (e.g., a microprocessor, a controller, a CPU, a GPU, etc.) or several processors configured by software. A "computer" may be one or more apparatuses and/or one or more systems that are capable of accepting a structured input, processing the structured input according to prescribed rules, and producing results of the processing as output. Examples of a computer include: a stationary and/or portable computer; a mobile device such as a cell phone; a computer having a single processor, multiple processors, or multi-core processors; a general purpose computer; a supercomputer; a mainframe; a workstation; a micro-computer; a server; a client; a web appliance; a telecommunications device with internet access; a tablet; a personal digital assistant (PDA); application-specific hardware, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC). As is understood, "software" refers to prescribed rules to operate a computer. Examples of software may include: script, HTML code, micro-code; code segments; instructions; applets; pre-compiled code; compiled code; interpreted code; computer programs; and programmed logic.

A website refers to a one or more web resources, such as web pages, hosted by a web server typically associated with the same domain name. Reference herein to accessing a web resource, such as a web page, also indicates access to the website of the web resource. A web resource may be information obtained by a user device, such as by a web browser or other application of a user device, over a network (e.g., the Internet) and/or using TCP/IP, such as using HTTP, in this latter case, such a web resource may be referred to as an HTTP loaded resource or an HTTP resource. HTTP resources may be identified and located on a network (e.g., the Internet) by Uniform Resource Locators (URLs). HTTP (Hypertext Transfer Protocol) as used in this application includes both HTTPS as well as other less secure versions of HTTP, such as HTTP/1.1 and HTTP/1.0 (which may be referred to herein as unsecure HTTP to distinguish these protocols form HTTPS. HTTPS is a secure version of HTTP and is often referred to as HTTP Secure, HTTP over Transport Layer Security and HTTP over SSL.

A web page may be identified by a uniform resource locator (URL) (also referred to as a web address), such as http://www.example.com/filename.html, where "http" indicates a protocol, "www.example.com" is a hostname, and "filename.html" is a path portion of the URL providing a filename ("filename.html"). A hostname (e.g., www.example.com) may have an IP address assigned to it, where the IP address identifies a host computer and may be used to access the host computer over the Internet. Unless context indicates otherwise, an IP address is a public IP address, such as an IPv4 address or IPv6 address. The host computer may be a web server, e.g. The hostname is formed several labels separated by dots or periods ("."). It will be appreciated that "www.example.com" sets forth several domain names, including a top level domain ".com", the second level domain "example.com" as well as the domain name assigned to a host computer "www.example.com" (making this last domain name a hostname as well). A hostname may comprise a "host-specific" label and a domain name separated by a period ("."). In this example, the hostname www.example.com comprises the domain name "example.com" and the host-specific label "www". While a host-specific label of a hostname is sometimes referred to itself as a "hostname," such terminology is not adopted by this application (although "local hostname" would be appropriate). In this application, "hostname" includes any domain name that may be used to obtain an IP address, where such IP address fully identifies a particular host computer (e.g., sufficient to identify the host computer without further address information). Thus, "hostname" as used in this application does not refer to the host-specific label of a domain name (although a hostname may include host-specific label). It will be appreciated that while the domain name formed by all the labels in a URL between the double slashes "//" and the immediately following slash "/" will typically be a hostname (e.g., if it may be used to obtain an IP address to identify a host computer), it should also be appreciated that portions of this domain name (e.g., portions after the host-specific label immediately following the double slashes "//") may also form a hostname (e.g., "example.com" may also qualify as a hostname if it may be used to obtain an IP address assigned to it to identify a host computer). Depending on context, a web page may refer to a type of web resource, such as a particular document (e.g., HTML document) of the website, that may be accessed over the Internet, or a web page may refer to the rendering of a web browser in response to such a document (e.g., the rendering of an HTML document). Rendering of a web page by a web browser refers to the particular configuration of a user interface, such as images displayed and music played by a computer, caused by a web browser application in response to accessing a particular document (e.g., an HTML document). It should be appreciated that when "web page" refers to a document (e.g., an HTML document), access of such a document need not result in any rendering (e.g., display) by an accessing browser. Thus, a web browser access may comprise accessing resources from a host computer over the Internet without any rendering by the web browser in response to such access. Reference herein to "web resource" and accesses to such a web resource may be used to emphasize that web accesses by a web browser need not result in a rendering by the web browser in response to such an access (although access of a "web resource" may result in rendering by a web browser). For example, a web browser may access over the Internet a web resource hosted by a web site simply to obtain and execute script (e.g., JavaScript) from the host computer, where such access and execution does not result in any rendering by the web browser.

An ad server refers to one or more servers which obtain an ad that is provided to a web browser. Depending on context, an ad call may refer to the actions of these one or more servers (comprising the ad server) and the web browser to obtain the ad, or may refer to the initial request by the web browser or other application of a computing device that initiates obtaining the ad.

FIG. 1 depicts a system for implementing identification of a mobile device and other computer devices according to certain embodiments. A method and system for identifying a mobile device 110 may be implemented on a network 10, such as the Internet. A plurality of devices may be connected to and through the network 10, such as mobile devices 110, a computer 120, which may be a personal computer, such as a desktop computer or a laptop, and a plurality of servers 130, 140, 150, 160, 170 and 180.

Each mobile device 110 may be a smart phone comprising a cell phone that performs the functions of a computer and comprise a touch screen (not shown) as a user interface, providing internet access via a web browser application 116 and configured to download from the network 10 other applications 114. The mobile device 110 may have a mobile operating system (OS) 112, such as iOS™, Android™, Windows Mobile™, BlackBerry™ OS or WebOS™ (or Open WebOS™). The mobile OS 112 may comprise software configuring the computer hardware of the mobile device 110 (e.g., one or more processors and memory, such as DRAM and/or NAND flash memory) to run various functions of the mobile device 110, such as controlling interaction of the user interface, operation of the cell phone radio to provide wireless cell phone communications with cell phone network 190, operation of a various hardware of the smart phone mobile device, such as a camera and an associated image processor, a GPS (global positioning system) chipset, an accelerometer (e.g., a micro-electromechanical (MEMs) chip), a heart rate monitor and a fingerprint scanner, for example. The mobile OS 112 may also be responsible for the installation and operation of various applications of the mobile device 110, such as web browser application 116 and other applications 114 that may be previously installed on the mobile device 110 (e.g., an e-mail application) or may be an application downloaded via network 10. The mobile device may be Apple's™ iPhone™, Samsung's™ Galaxy™, Huwei's™ Mate S™, and the mobile operating system (OS) 112 may be iOS™, Android™, Windows Mobile™, BlackBerry™ OS, WebOS™ (or Open WebOS™) Firefox OS™ or Sailfish OS™.

The mobile device 110 may be connected to the network 10 (and other devices connected to the network 10) in a conventional manner, such via a wireless cell phone network 190 or via a wireless local area network (LAN) 192, such as via a WIFI connection (e.g., 192a). The cell phone network 190 may be a conventional, such as, e.g., GSM, or CDMA, including 3G and 4G wireless connections such as UMTS, CDMA2000, Mobile WiMAX (IEEE 806.16(e) or IEEE 806.16(m)), LTE, etc., and may comprise future cell phone technologies (e.g., 5G). The wireless connection 190a of a mobile device 110 to a cell phone network 190 may comprise radio frequency signals 190a to and from the mobile device 110 and one or more base stations (e.g., transceivers mounted on cell towers) of the cell phone network 190. The mobile device 110 may include a two-way radio to communicate with the base station of the cell phone network 190, and have a range over several kilometers (over 6 km, over 25 km, etc.) As the mobile device 110 moves between neighboring cells of the cell phone network 190, the mobile device 110 may reconfigure its communication link to hand-off communications from the current base station and to initiate communications with the new base station. The cell phone network 190 may provide communications between the mobile device 110 and the network 10 via conventional structure, such as via fiberoptic cables to sever of an Internet service provider (ISP).

The mobile device 110 may also be connected to network 10 such as through wireless local area network 192 (acting as an access point to the network 10) via a wireless connection 192a. The wireless connection 192a of the wireless local area network 192 may be a WIFI connection (e.g., IEEE 802.11 (b), (g), (n) or (ac)). The mobile device may also be connected to network 10 via a wide area network (WAN) (not shown), via a metropolitan area network (MAN) (not shown), etc.

Computer 120 may be a personal computer, such as a laptop or a desktop, and is connected to network 10 in the example of FIG. 1 via a wired connection 194 through LAN 192, although a wireless connection (e.g., 192a) via LAN is also contemplated. Computer 120 may also comprise an operating system 112, one or more applications 114 and a web browser application 116, although these may differ from those of mobile devices 110, just as these may differ from one mobile device 110 to another mobile device 110. Only one computer 120 is shown in FIG. 1 for ease of explanation, but it will be understood that a plurality of such computers 120 may be connected in various ways to network 10. Reference to computer in the singular form hereinafter will be understood to be equally applicable to other like computers.

As explained in further detail below, mobile devices 110 and computer 120 may be operably connected to one or more servers 130, 140, 150, 160, 170 and 180 through network 10, such as via TCP/IP (Transmission Control Protocol/Internet Protocol). The servers 130, 140, 150, 160, 170 and 180 are exemplary, and represent different server uses with respect to the disclosed embodiments. Although only one of each type of server is illustrated and referenced herein, this is for purposes of ease of discussion. It will be recognized that a plurality of each type of server 130, 140, 150, 160, 170 and 180 may be provided. Further, it should be appreciated that each server need not perform or be configured to perform all of the possible interactions and processes described herein. Thus, e.g., one vendor server 180 may provide a website through which purchase may be made, while another vendor server 180 may be responsible for providing applications 114 that are downloaded on mobile devices 110 and computers 120 and tracking the running of such applications 114 (although such description herein may refer to the "vendor server 180" in the singular in describing such actions). In addition, a single server may perform the roles described with respect to the different server types referenced herein.

Web server 130 is a server that hosts one or more websites that may be accessed by computer 120 and mobile devices 110. The web server may be a computer or a plurality of interconnected computers (such as plural servers connected over network 10). The web server 130 may be configured to store, process and deliver web pages of a website or other web resources of a web site to a client, which may comprise one of the mobile devices 110 and the computer 120. Specifically, in response to a request received over the network 10 from the web browser 116 (or other user agent) of one of the mobile devices 110 or computer 120, the web server 130 may provide web pages 132 and other information to the requesting device. The web pages 132 are typically formatted as HTML (Hyper Text Markup Language) documents which include images and other HTML constructs which the web browser 116 interprets to provide the web page 132 to the user, such as displaying the images and text of the HTML document, as well as reacting to user inputs (e.g., mouse clicks) with respect to the displayed web page. The web pages 132 may include embedded programs 132a, such as JavaScript™ that cause the web browser application 116 to perform various processes defined by the embedded program 132a. Communication between the web server 130 and the web browser 116 (of either mobile device 110 or computer 120) may take place using HTTP (Hypertext Transfer Protocol), including a relatively unsecure version of HTTP (e.g., HTTP/1.0 or HTTP/1.1) or HTTPS (often referred to as HTTP Secure, HTTP over Transport Layer Security and HTTP over SSL).

Other servers may communicate with between the web browser 116 of a user's mobile device 110 or computer 120, as described herein with respect to web server 130. For example, content server 170 may store a variety of content, such as a user's e-mail, text documents, reports, spreadsheets, presentations, music, photographs and other images, video, etc., which may be accessible by the user via communication with the content server 170 via web browser 116. Ad server 150 may provide advertisements (ad) to a user of the web browser 116. For example, web page 132 may include an HTML inline frame tag (or "iframe" tag) to embed another HTML document within the web page 132 (e.g., "<iframe>src="http://www.adverstisementtobedisplayedinwebpage132.com"></iframe>where src specifies the URL (uniform resource locator) address of the document to embed in web page 132. An aside tag may also be used to provide a section of the web page 132 that is set aside to display an ad. Other mechanisms may also be used to embed an ad into web page 132 as it is delivered to mobile device 100. The ad may be may be a still image or video and include a URL link that opens a web page of the advertiser upon receiving an appropriate input (e.g., mouse click on the displayed ad) by the user of the web browser 116.

The ad may be provided to the web browser 116 by ad server 150 in response to an ad tag (HTML code) provided as part of the web page 132 received by the browser 116. It should be appreciated that "ad server" as used herein refers to one or more servers with which the web browser 116 may communicate or otherwise may be used in the process of obtaining an ad to be rendered by the web browser 116 in response to an ad call initiated by the web browser 116. For example, the web browser 116 may initiate an ad call (requesting an ad be delivered) in response to the ad tag. The ad tag may point to a publisher's server (acting as ad server 150) which communicates with the browser 116 to deliver the ad to be rendered by the browser 116. In other instances, the process of obtaining an ad may be more complex. For example, the ad tag provided to web browser 116 as part of web page 132 may instead point to a third party server (e.g., sell side platform server, or SSP server) that conducts an auction to identify the highest-paying ad. The web browser 116 may initiate an ad call by sending a request to the SSP identified by this pointer and in response, the SSP returns code back to the web browser 116 to cause the web browser 116 to access a publisher's server associated with the winning bid (after the SSP conducts the auction). The code provided by the SSP server may point to the publisher's server, but often may instead comprise a pointer causing the web browser 116 to communicate with a demand side platform server (DSP server) responsible for winning the bid, which then redirects the web browser 116 to access the ad provided by the publisher's server. In this latter case, the ad server 150 is considered to be the SSP server, the DSP server and the publisher's server.

App store server 160 may host one or more websites and/or web applications that allow a user to search, review, rate and download various applications that may be installed and run on mobile device 110 or computer 120.

Vendor server 180 may be a server hosting a website of a vendor through which goods (physical goods and applications, e.g.) or services may be purchased by a consumer. The website may include one or more web pages 182 formed as HTML documents which may have an embedded program 182a (e.g., script such as JavaScript) embedded therein. All or part of embedded program 182a may be the same as embedded program 132a.

As discussed in more detail below, identity server 140 may be configured to perform various tasks, such as provide durable ids DID 117 to mobile devices 110 and to later obtain such DIDs 117 from the mobile devices 110.

Mobile devices 110 and computer 120 may include various applications 114 installed therein, such applications for games, music, news, social media, utility (e.g., maps, travel, etc.) health, etc. In many instances, a user may have an option to download an application for free or pay for the same application. Rather than paying for an application, a user may instead elect to be receive advertisements through the application 114, such as having the application 114 provide advertising in the form of embedded banner ads or video ads in an image displayed by the application 114 on the mobile device 110 or computer 120, or the playing of advertisement videos prior to allowing the user to access and use the application. A user may instead to decide to purchase and download an ad-free application 114 or pay to stop receiving advertisements by reconfiguring a downloaded application 114 previously set to receive and display advertisements. Thus, a user may sample an application for free, and if advertisements are desired to be avoided, pay for the application. Or the user may determine that receiving advertisements is acceptable and continue to use the application without payment.

In providing advertisements to user, it is typically beneficial to both the advertising vendor and the user to have the user receive an advertisement of interest to the user, or otherwise targeting the interests of the user. A vendor benefits by providing advertisements to those users most likely to result in a sale of a vendor's product. A user often prefers advertisements in products and services that may be desirable for the user and provide a benefit to the user.

There are a variety of systems and tools to match advertisements to users. For example, web browser applications 116 may accept and store "cookies" on a cache of the web browser 116 (or similar information in a LocalStorage cache of the web browser 116) as bits of data that may later be retrieved and analyzed in later communications with the same or other web servers 130. Cookies may include first party cookies (1P cookies) that identify a web site and/or particular web page 132 that the web browser 116 has accessed. Cookies may also include third party cookies (3P cookies) that identify third party content provided by browsing a website but are not stored or content provided directly from the web site. For example, many advertisements are provided through accessing a web page 132, the content of which is provided from a third party, such as via ad server 150. If supported by a web browser, a such a third party cookie may be stored in the cache of the web browser to identify that the web browser of a user's device has been provided with a particular advertisement. Later communications via the web browser 116 with the same or other web servers 130 may provide such 1P cookies or 3P cookies to the web server to reveal attributes of the user which vendors may use to determine if an ad should be sent to such a user for a particular service or product of the vendor. The cache of the browser may be a folder created and/or accessible by the web browser 116 in which the cookies are stored, such as a "profile folder" "local settings" folder or a "user data" folder (name and location of such a folder being determined by different types of web browsers 116). Information (which may include the same information provided by cookies, such as the information in the DID cookies and IFA cookies described herein, including identifying code and encrypted or unencrypted DID and/or IFA data) may similarly be stored in and retrieved from a LocalStorage cache as provided by HTML5, or by other caches of the web browser 115 (e.g., image cache). This may be in addition or as an alternative to the use of cookies as described herein.

When the user accesses a web site via a non-mobile device or devices connected to network 10 via a non-mobile access point, such as computer 120 or mobile device 110 connected to LAN 192, the device may be identified by the IP address associated with the device. Although the IP address may be altered during subsequent use of the device (e.g., a dynamic IP address), a unique identifier stored in any first and third party cookies of the web browser 116 can be retrieved by a web server to relay the identity of the mobile device 110 even though the IP address has changed.

However, using cookies or information in a LocalStorage cache to identify mobile devices 110 connected to the network via cell network 190 is often problematic. For examples, may web browsers 116 of mobile devices 110 are not configured to store third party cookies. To identify mobile devices 110, many mobile operating systems 112 create and store an identifying code on the mobile device 110 which is transmitted to third parties via network 10 to identify the mobile device 110, such as to determine what advertisement may be sent to the mobile device 110. For example, Apple's™ iPhones™ create a unique code for each iPhone called an IDFA (IDentification For Advertisers) while Google's™ Android™ phones create a unique code for each Android™ phone called an AAID (Android Advertising ID). For the purposes of this disclosure, such identifying codes used for advertisement selection are referred to herein as IFA's (113 in FIG. 1) (i.e., Ids For Advertisers). Unless disabled by a user of the phone, such IFAs 113 may be provided as part of an ad call. For example, an IFA of a mobile device 110 may be sent over the internet to a web resource to elicit an advertisement to be generated (e.g., displayed) within an application (e.g., application 114) of the mobile device 110. Applications 114 may include instructions which may cause such and ad call. IFAs 113 may also be used for frequency capping, to limit the number of times same advertisement is sent to a user, and to attribute an advertisement to a later action of the user, such as clicking on an ad, downloading an application or signing up for something (e.g., a user providing user information to a website). IFAs are typically implemented to allow a user to opt out of providing an IFA via user configuration of device settings (e.g., user configuring operating system settings via a touch screen menu). Such opt out may result in providing a code of all zeros or all ones to be stored as an IFA so that such code may no longer be used to identify the mobile device 110 (a code that is shared among multiple mobile devices 110).

Generation of the IFA may be performed by the mobile device 110 requesting a new IFA from a server associated with the OS 112 of the mobile device 110. For example, an iPhone may send a request to a server of Apple. Such a server may track assigned IFAs to identify unassigned IFAs and provide an unassigned IFA to the mobile device 110 which then stores the IFA at known location (e.g., a predetermined logical address within nonvolatile memory, a particular register, etc.) within the mobile device 110. The newly assigned IFA is therefore unique to the mobile device 110 for that type of IFA (e.g., a unique IDFA code or a unique AAID code). Generation of the IFA may be initiated by the OS 112 of the mobile device 110. In addition, in many implementations, the IFA 113 of the mobile device 110 may only be accessible through a request to the OS 112 of the mobile device, such as through use of an API of the OS 112.

Conventional use of IFAs 113 may have limited applicability. For example, some IFAs 113 are limited to use with applications 114 and are not useable with certain standard web browsers 116. For example, although Apple's™ IDFA may be implemented by applications running on Apple's™ iPhone™, Apple's™ Safari web browser 118 does not provide access to the IDFA of an iOS device. Thus, identification of an iPhone™ or other mobile device 110 using an IFA 113 (such as Apple's™ IDFA) by access via a web browser 116 is not possible. Web browser 116 may be configured so that it may not access the IFA 113 stored (or the storage location) within the mobile device 110. For example, the web browser may not be configured to make any calls or other requests to the OS 112 that would result in the OS 112 providing the IFA 113 to the web browser 116 in response to such a call/request.

FIG. 2A illustrates an example method according to one embodiment. The method of FIG. 2A may allow a mobile device 110 to be identified by the IFA 113 of the mobile device 110 via use of a web browser 116 even when the web browser 116 is not configured (i.e., unable) to access an IFA 113 of a mobile device 110 and/or is otherwise unable to provide an IFA 113 of the mobile device 110 to a web server 130 (or another device external to the mobile device 110). The method will be explained with respect to a mobile device 110 of FIG. 1 (that may be connected to the network 10 via cell phone network 190 or via wireless connection 192a through wireless LAN 192), but is applicable to other devices, such as computer 120 or a mobile device 110 connected to the network 10 through other types of connections. It will be appreciated that the systems and devices described herein (e.g., such as described with respect to FIG. 1) may be configured to perform the actions described with respect to the methods described herein, such as via software code. Such systems, devices and software code (e.g., as provided on a non-transitory computer readable medium, e.g., non-volatile memory, volatile memory, a hard drive (e.g., solid state drive), computer disk, etc.) are also exemplary embodiments this invention.

In step 202, a durable ID (DID 117) is generated and stored on the mobile device 110. The DID 117 may be generated and stored automatically without requiring user inputs or instructions dedicated to generation of the DID 117. For example, the DID 117 may be automatically generated when an application 114 is installed or run on the mobile device 110 or when the mobile device 110 accesses a web page without requiring any user interactions (or otherwise altering a user's interaction with the application or web page). The DID 117 is a code that is unique to the mobile device 116. Thus, each mobile device 110 having a DID 117 will have a DID 117 with a code unique to that mobile device 116. As explained in further detail herein, as part of generating the DID code 117 of a mobile device 110, identity server 140 may be accessed to determine a DID code that has not yet been assigned to a user device and perform various operations to store the determined DID code 117 in the mobile device 110. The DID 117 is considered durable as it retained by the mobile device 110 even after being shut down or completely without power. However, as discussed herein, the DID 117 may be removed from the mobile device 110.

In the example of FIG. 1, the DID 117 is stored in a cache of the web browser 116 of the mobile device 110, but the DID 117 may be stored in other locations of the mobile device 110. The DID 117 may be generated by running an application 114, such as an application 114 downloaded from app store server 160. The downloaded application 114 may comprise software code, such as an SDK (software development kit) 115, that upon being run by the mobile device 110, instructs the mobile device 110 to perform various operations to store the DID code 117 and to provide the IFA 113 of the mobile device 110 to identity server 140. For example, upon running the SDK 115 of application 114, the mobile device 110 may provide the IFA 113 of the mobile device 110 as part of a request to initiate generation of a DID code 117 to identity server 140. The identity server 140 may determine a unique DID 117 for the requesting mobile device 110 and store and associate this DID 117 and the IFA 113 of the mobile phone in a look-up table 144*a* of database 144 of identity server 140. FIG. 2C illustrates an example of such a look-up table 144*a*.

Step 202 may also be performed by generating the DID 117 by executing script on a browser 116 where the script is provided to the browser 116 as a result of the browser 116 accessing a web page or other type of web resource. For example, script 132*a* may be provide to mobile device 110 as a result of browser 116 of mobile device 110 accessing web page 132 of web server 130. Script 132*a* may then be executed by browser 116 to determine whether a DID 117 already is available for retrieving from mobile device 110. If no DID 117 is detected, execution of script 132*a* may cause generation and storage of a 117 DID on the mobile device, such as within one or more caches of browser 116 of the mobile device 116. The identity server 140 may determine the IFA 113 of the mobile device 110, such as at a later time when the mobile device 110 runs an application 114 and SDK 115 within the application 114, as described herein. The identity server 140 may determine that the mobile device 110 already has been assigned a DID 117, such as by determining that the mobile device 110 has a DID cookie (e.g., a cookie containing the DID 117 and an identifier code identifying the cookie as a DID cookie), retrieve the DID 117 from the mobile device 110. The identity server 140 may then update the entry of the look-up table 144*a* containing the obtained DID 117 by storing the DID 117 in a field of that entry and thereby associating the IFA 113 and DID 117 of the mobile device. In addition, the identity server 140 may also update one or more entries of an ad tracking table 154*a* (described in more detail below) that contain the obtained DID 117 by storing the DID 117 in a field of each such entry and thereby associating the IFA 113 with each of these entries.

In step 204, the mobile device 110 having the DID 117 stored therein, accesses a web page (or other type of web resource), such as web page 132 on web server 130 (this mobile device may be referred to herein as an "accessing mobile device" even after such access has ended). Web page 132 may provide any variety of user content (e.g., content of web page 132 need not be associated with any downstream processing by the system). Note that when DID 117 is generated by executing script on browser 116 that is obtained from a web page in step 202, the web pages accessed by the mobile device 110 in steps 202 and 204 may be different from each other, associated with different domain names and/or hosted by different web servers 130.

In step 206, web server 130 hosting the web page 132 may determine if the mobile device 110 has opted out of allowing use of a DID 117 of the mobile device 110. For example, the web server 130 may review HTTP cookies stored in a cache of the web browser 116 to determine if an "opt-out" cookie has been stored therein, indicating an opt-out selection by the user of the mobile device 110. In addition, or alternatively, the web page 132 may provide an opt-out link associated with a displayed opt-out "button" displayed on the mobile device display by the web browser 116, where selection of the opt-out button (e.g., a touch input or mouse click) causes an opt-out request to be sent to identity server 140. If such an opt-out selection (e.g., opt-out cookie or opt-out request) is detected, the method proceeds to step 208 where any cleanup actions that may be needed are performed. The method may be terminated after step 208.

If no opt-out is detected in step 206, the method may proceed to step 207, where the web browser 116 of the accessing mobile device 110 is examined for storage (e.g., in a cache of the web browser 116) of an IFA and/or DID 117 that may be read by a server, such as identity server 140. For example, in response to executing script obtained from accessing web page 132, web browser 116 may be redirected to communicate with identity server 140. Identity server 140 may attempt to read any cookies containing an IFA of the mobile device 110 (which may be referred to herein as an IFA cookie) and/or any cookies containing a DID 117 of the mobile device 110 (which may be referred to herein as a DID cookie) and/or any cookies containing an ID assigned to the mobile device 110 that may be used to identify the mobile device 110 (which may be referred to as an ID cookie, such as an IFA cookie or an DID cookie). Alternatively, or in addition, identity server 140 may examine the LocalStorage cache of web browser 116 for an IFA, DID or other ID assigned to the mobile device. An IFA cookie may include a predetermined code in addition to the IFA to identify the cookie as an IFA cookie. Similarly, a DID cookie may include a different predetermined code in addition to the DID identifying the cookie as a DID cookie. The IFA 113 and DID 117 may be stored in LocalStorage and/or in cookies unmodified (e.g., the IFA 113 and the DID 117 may be stored in LocalStorage or as part of a cookie in the original binary code assigned as the IFA 113 and DID 117). Alternatively, the IFA 113 and DID 117 may be stored in an encrypted format in LocalStorage or cookie. The storage of the IFA 113 and DID 117 may have been performed previously by a server, such as identity server 140, as a result of an earlier access by web browser 116 of this server.

The existence of an IFA cookie and/or DID cookie and/or IFA in LocalStorage and/or DID in LocalStorage in the mobile device 110 may be identified if a predetermined code is found in a cookie or data of LocalStorage stored in the cache of the web browser 116. For example, all IFA cookies may include the same first predetermined code and all DID cookies may include the same second predetermined code. Such predetermined code may comprise a URL code of a web page accessed by the mobile device 110 (e.g., a web page of identity server 140) as part of creating and storing the IFA or DID cookie. Similar predetermined code may be similarly used for such identification in LocalStorage. Such identification of a such a predetermined code may be performed by the web browser 116 by executing script 132*a* obtained in step 204 from web server 132, or may be performed by identity server 140 in response to web browser 116 accessing identity server 140 (e.g., in response to being redirected to access a web page of identity server 140 which results in cookies of the web browser 116 and/or LocalStorage data being transmitted to and analyzed by identity server 140). If a cookie containing an IFA or DID is found in the accessing mobile device 110, the method proceeds to step 220, otherwise the method proceeds to step 210.

In step 210, the DID 117 of the accessing mobile device 117 is obtained. For example, a script 132*a* (such as JavaScript™) may be provided to the web browser 116 from web server 130, such as script 132*a* that is part of the HTML document constituting the downloaded web page 132 accessed by the mobile device 116. This script 132*a* may be provided as an SDK embedded in web page 132, which may be the same SDK (e.g., an exact copy) of the script used to generated a DID in step 202 (i.e., the SDK embedded in web page 132 may configure a browser to perform the functions described with respect to steps 202 and 206, although such steps are also contemplated to be performed by a browser as a result of accessing different web pages each having such an SDK embedded therein). Upon executing the script 132a, the web browser 116 may provide the DID 117 to a server via network 10. For example, the web browser 116 may provide the DID 117 to the identity server 140 and/or to the web server 130, which may be in the form of sending code to the identity server 140 and/or the web server 130, or by performing a series of actions monitored by the identity server 140 and/or web server 130 from which that server (140 and/or 130, e.g.) may determine the DID 117 of the mobile device 110.

In step 212, the obtained DID code 117 is used to check whether or not opt-out has been selected by the user of the accessing mobile device 110. For example, the DID code 117 obtained from the mobile device 117 may be examined to determine if it is an opt-out code. The opt-out code may be a predetermined code that reserved by identity server 140 to represent an opt-out selection of a mobile device 110 (e.g., all zeros or all ones, or some other predetermined code). If the obtained DID code 117 is an opt-out code, the process may proceed to step 208 (where any desired clean up action may be performed). As another example of checking for opt-out, the obtained DID 117 need not be determined to be an opt-out code. Rather, identity server 140 may access the entry (e.g. record) in the look-up table 144a stored in database 144 containing the DID 117. The entry may include a flag or other indicator to indicate whether the received DID 117 is associated with an opt-out request by or associated with a particular mobile device 110. In an embodiment where web server 130 initially obtains the DID code 117 from mobile device 110, the web server 130 may send the obtained DID 117 of the accessing mobile device 110 to the identity server 140 which may then check for an opt-out flag in the look-up table 144a. In this instance, the web server 130 may receive the results of this check from the identity server 140 (in which case, it may be responsible for performing the actions of step 208) or alternatively, the identity server 140 may be responsible for performing the actions of step 208.

If the identity server 140 determines the DID 117 is associated with an opt-out request, the identity server 140, the process may then proceed to step 208 to perform any desired cleanup actions. For example, the identity server 140 or web server 130, having determined an opt-out is associated with the obtained DID 117, may provide script to the accessing mobile device 110 (e.g., to be run by the web browser 116 of the mobile device 110) to erase the obtained DID 117 from the mobile device 110. Erasure may be in the form of altering the code of the DID 117 of the accessing mobile device to store the opt-out code (e.g., all zeros, or all ones, or some other code). It will be apparent that the opt-out code may be shared between multiple mobile devices 110 (to indicate an opt-out of these mobile devices 110) and as it is not unique, the opt-out code does not identify any particular mobile device 110.

If an opt-out is not determined in step 212, the process proceeds to step 214 where the IFA 113 associated with the DID 117 in look-up table 144a is obtained by the identity server 140 by identifying the entry in the look-up table 144a containing the DID 117 obtained in step 210 or step 220, and obtaining the IFA 113 associated with the DID 117 in that look-up table entry.

The IFA 113 obtained by identity server 140 may be the same as that currently stored in the accessing mobile device 110. However, it should be noted that the IFA 113 of the mobile phone 110 may have been modified (or the user may have opted out of IFA 113 usage) since the previous IFA 113 was stored in the database 144 of the identity server 140.

The IFA 113 obtained in step 214 may be sent to the web server 130 in embodiments where the web server 130 performs actions associated with step 216. Alternatively, the web server 130 may not perform actions associated with step 216 and identity server 140 may directly communicate with web browser 116 to perform actions associated with step 216. In the example where web server 130 requests an IFA from identity server 140, it should be appreciated that, in response to the same request received from the web server 130 (providing the obtained DID 117 from the requesting mobile device 110), either the IFA 113 may be provided (step 214) or information indicating that the DID 117 is associated with an opt-out (step 212) may be provided by the identity server 140.

In step 216, based on the obtained IFA 113, mobile device 110 may be provided an advertisement (e.g., text, audio, still image, and/or video) which is then rendered (e.g., displayed and/or played) by the web browser 116 of the mobile device. For example, the obtained IFA 113 may be provided to the ad server 150 which then uses the IFA 113 to select an advertisement and returns the appropriate information (such as a URL link) to the web browser 116 of the mobile device 110 (via an appropriately formatted command or script) for display of the advertisement by the web browser 116. Use of the IFA 113 can be reserved, non-reserved, network, RTB, client side or server side header bidding, etc.

In one example, script 132a provided to web browser 116 of the requesting mobile device 110 (in step 204) includes an ad tag that includes a call to obtain the requesting mobile device's IFA 113 as described herein (e.g., from an external server 140 (step 214) or from reading data from a cache of the web browser 116, such as reading an IFA cookie or IFA data in LocalStorage (step 220)). After obtaining its IFA 113, the web browser 116 acting on the ad tag initiates an ad call including the IFA 113. The IFA 113 is then used by the ad server 150 to select and deliver an ad to the web browser 116 (step 216).

In another example, script 132a provided to web browser 116 of the requesting mobile device 110 (in step 204) includes a call to obtain the requesting mobile device's DID 117 as described herein (e.g., from an external server in step 210 or from reading data from a cache of the web browser 116, such as reading a DID cookie or DID data in LocalStorage in step 220). In this example, the DID 117 is returned to the requesting mobile device 110 from the identity server 140 (or another server, such as web server 130 in the alternative implementation) as part of step 210 when the DID 117 is obtained via step 210. After obtaining its DID 117, the web browser 116, acting on the ad tag, sends an ad request including the DID 117, which is then used by the ad server 150 to select and deliver an ad to the web browser 116 in step 216. In this example, step 214 may include ad server 150 obtaining the IFA 113 of the requesting mobile device 110 by (a) receiving, from the web browser 116, the ad request including the DID 117 obtained by the requesting mobile device (e.g., in step 210 or 220) and (b) obtaining the IFA 113 of the requesting mobile device 110 from look-up table 144a of the identity server 140. The ad server 150 may then use the obtained IFA 113 to select and deliver an ad to the web browser 116 of the requesting mobile device 110 (step 216). Alternatively, in step 214, upon accessing the look-up table 144a of server 140, if no IFA 113 is found to be associated with the DID 117 included with the ad request sent from the web browser 116, the ad server 150 may use the DID 117 in step 216 to select and deliver an ad to the web browser 116 of the requesting mobile device 116 (in which case, an IFA would not be used in step 216 to select and deliver an ad). In these latter implementations, an IFA 113 of the requesting mobile device 110 need not ever be sent to (or stored in a cache of the web browser 116 of the requesting mobile device 110) as part of any steps of the method and configuration of the system.

It will be appreciated that when the web browser 130 obtains the IFA 113 from the identity server 140, the actions of identity server 140 described with respect to step 216 may be instead performed by the web browser 130.

In step 218, the advertisement may be tracked if desired. For example, after providing the advertisement to the accessing mobile device 110 in step 216, one or more later actions of the accessing mobile device 110 may be determined to be associated with the same mobile device 110 that had been previously provided with the advertisement. Such actions may include downloading (e.g., from the app store server 160), installing and/or running an application 114, making a purchase through a vendor website 182 via web browser 116, signing up for something (e.g., a user providing name and/or contact information, such as an e-mail address to a website) via accessing a server via web browser 116, etc.

Such later actions may be determined to be those of the same mobile device 110 previously served the advertisement by (a) obtaining the IFA of this later accessing mobile device 110 and (b) determining that the IFA 113 of this later accessing mobile device 110 matches the IFA 113 of the mobile device 110 to which the advertisement was previously served. An ad tracking table (see 154*a* of FIG. 2B, e.g.) may be implemented to perform these functions. The obtained IFA 113 may be used for other purposes than those described herein, such as other advertising purposes.

Returning back to step 207, if a cache of the browser 116 is found to include data that may be read by an external server (e.g., identity server 140) that includes an IFA 113 and/or DID 117 (e.g., a cookie containing an IFA 113 (an IFA cookie) or a cookie containing a DID 117 (a DID cookie) or IFA data or DID data in LocalStorage), the method proceeds to step 220 where the IFA 113 and/or DID 117 is obtained from such data. For example, either the web browser 116 or an external server, such as identity server 140, may analyze the cookies stored in a cache of the web browser 116 of the accessing mobile device 110 to determine the existence of an IFA cookie and/or a DID cookie (such as reviewing such cookies for a corresponding predetermined code that identifies one of these cookies as an IFA cookie or a DID cookie, as described herein), and/or similarly analyze the data read from LocalStorage. For example, the IFA cookie (or DID cookie) may be obtained by the identity server 140 and the portion containing the IFA data 113 (or DID data 117) may be identified. In some examples, the IFA data of the IFA cookie (or DID data of the DID cookie) may be in an encrypted format, and the original IFA code 113 (or original DID code) may be obtained by decrypting the IFA data of the IFA cookie (or DID data of the DID cookie) by the identity server 140 using a known key. The original IFA code 113 may have been previously obtained from the mobile device 110 as described elsewhere herein and then stored in as an IFA cookie (in encrypted or unencrypted format) on the accessing mobile device 110 (e.g., as described herein with respect to step 214 of FIG. 2A and in particular, step 319 of FIG. 3B). For example, the process of FIG. 2A may have been performed previously with respect to the same accessing mobile device 110 and the same or different web server 130, where no IFA cookie was found in step 207 but later obtained in step 214 and stored as in an IFA cookie in step 214 in the web browser 116 of the accessing mobile device 110. Similar processes may be performed with respect to data read from other caches of the browser 116, such as LocalStorage.

In step 222, the IFA 113 and/or DID 117 read from a cache of the browser 116 in step 220 is used to determine if the mobile device 110 is associated with an opt-out. For example, the identity server 140 may access look-up table 144*a* to determine if an entry of the look-up table 144*a* contains an opt-out flag associated with the obtained IFA 113 and/or DID 117, similar to the process performed at step 212. If an opt-out is determined from the IFA 113 and/or DID 117 in step 222, the process proceeds to step 208 where any needed cleanup is performed. If an opt-out is not found, and an IFA obtained in step 220, the process proceeds to step 216. If an opt-out is not found and a DID was found in step 220 (e.g., no IFA was found in step 222), the process proceeds to step 214.

As discussed herein, upon detecting an opt-out, prior to termination of the method of FIG. 2A, cleanup actions may be performed in step 208. For example, all meta-data associated with the IFA 113 of the mobile device 110 selecting an opt-out may be erased, such as erasing data fields of look-up table 144*a*. For example, the entry of the look-up table 144*a* containing the IFA 113 associated with the opt-out selection may be set to the predetermined opt-out code (e.g., all zeros as shown in FIG. 2C or all ones). When the opt-out cleanup process of step 208 is initiated by an opt-out request initiated by user selection of an opt-out button of a rendered web page 132 (as described with respect to step 206), the IFA 113 may be obtained either from obtaining the IFA from reading an IFA from a cache of the web browser 116 (as described with respect to step 220) or by obtaining the DID 117 and then obtaining the IFA 113 associated with the DID 117, as described with respect to steps 210 and 214, respectively.

In addition, as part of the cleanup of step 208, the identity server 140 may communicate with the web browser 116 of the opting-out mobile device 110 erase the DID 117 of the opting-out mobile device 110, such as causing the mobile device 110 to store the predetermined opt-out code in place of a DID code 117 and thus overwrite the DID code 117. For example, this opt-out code may be stored in the mobile device 110 by implementing the process described with respect to FIG. 3C for the opt-out code. For example, the mobile device 110 may be instructed by the identity server 140 to access all n web pages (as described below) using HTTPS protocol. In addition, the identity server 140 may communicate with the web browser 116 of the opting out mobile device 110 to erase cookies that have been previously stored in a cache of the web browser 116 as part of performing one or more of the steps of FIG. 2A, such as erasing an IFA cookie containing IFA data as described below with respect to step 319 of FIG. 3B. Similar erasures may be made with respect to IFA and/or DID codes in LocalStorage of the web browser 116. In addition, the identity server 140 may communicate with the opting out mobile device 116 store an opt-out cookie in the cache of its web browser 116. The opt-out cookie may contain a predetermined code is found to identify the cookie (which may be the same predetermined code to identify the IFA cookie) and contain the opt-out code rather than IFA data. Alternatively, the predetermined codes used to identify the opt-out cookie and the IFA cookie may be different. The opt-out code may be written to other caches of the web browser 116, such as LocalStorage.

As described below with respect to FIG. 2D, the method of FIG. 2A may be repeatedly performed with respect to each of a plurality of different mobile devices 110 and a plurality of different computers 120. Further, for each of these devices 110, 120, the method of FIG. 2A may be performed repeatedly as part of a device's access of different web pages, delivery of different advertisements, and as part of running of different applications. Multiple entries of look-up table 144a and ad tracking table 154a in FIG. 2B reflect such repeated implementations.

It should be appreciated that not all steps of FIG. 2A need to be implemented. For example, implementation of steps associated with use of an IFA cookie or an IFA in Local-Storage may be omitted (e.g., 207, 220, and 222 of FIG. 2A and 319 of FIG. 3B). Different opt-out provisions may also make more or less steps possible with respect to opt-out related actions. Further, different uses of the IFA 113, the DID 117 and/or their association are possible. It will thus be apparent that providing an advertisement in step 216 and tracking an advertisement in step 218 are each optional and other or additional actions may be performed in place of or in addition to one or both of steps 216 and 218.

Figure 3B:
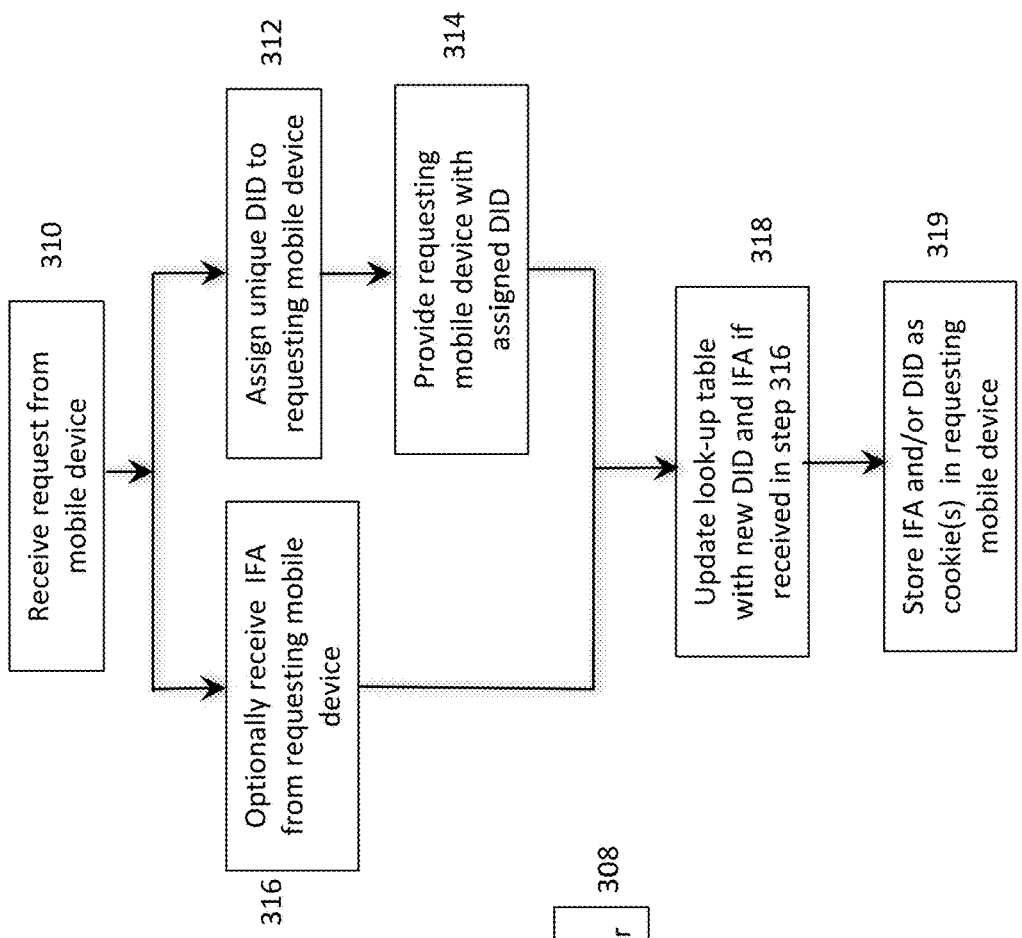
Figure 3A:
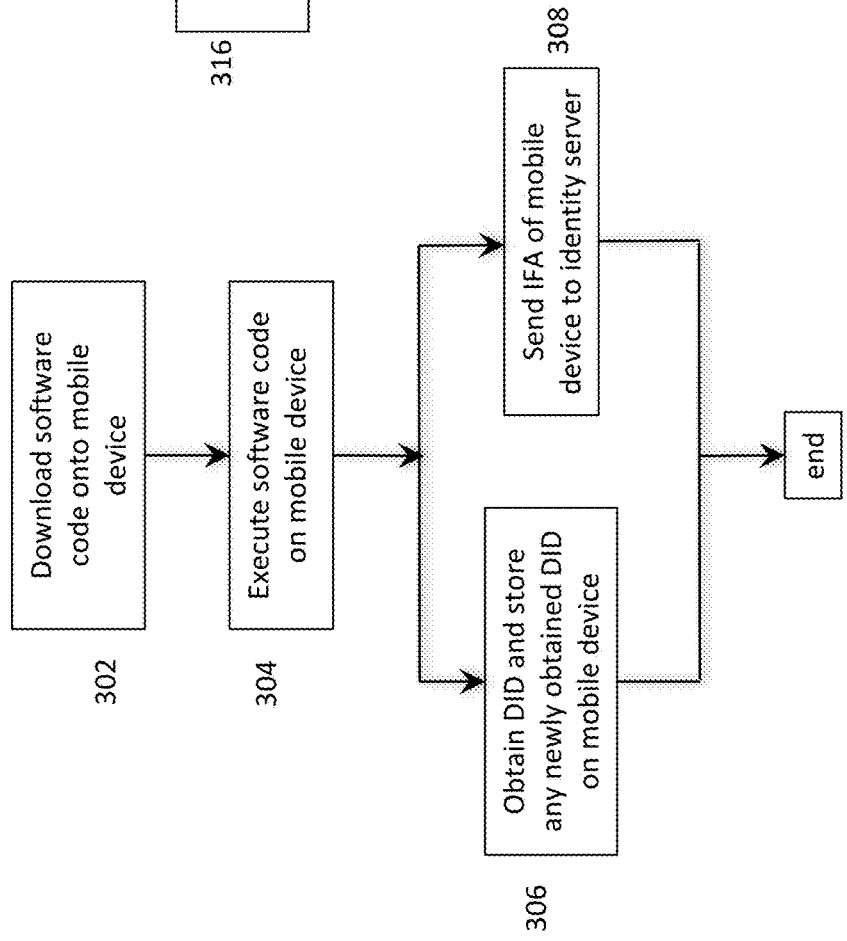

FIG. 3A illustrates one example of steps performed by a mobile device 110 that may be performed as part of generating a device DID 117 in step 202 and/or part of obtaining a DID 117 (such as step 203 described below). In step 302, a user of a mobile device 110 may initiate download of software code, such as an application 114 or software code obtained from a web resource, such as web page 132 of web server 130. For example, a user may select a particular application to initiate download through a touch screen or other user interface of the mobile device 110, which then causes the mobile device 110 to communicate with ad server 150 (e.g., over cell phone network 190 and network 10) to obtain the selected application 114 and store the same in the mobile device 110. For example, a user may instruct browser 116 through a touch screen or other user interface of the mobile device 110 to access web page 132, resulting in HTML document 132 (including script 132a) being downloaded onto the mobile device 110.

In step 304, the downloaded software code is executed by the mobile device. For example, application 114 is installed and run by the mobile device 110. For example, the downloaded HTML document 132 is rendered by web browser 116 of the mobile device 110.

In step 306, a software code segment of the downloaded software code is executed by the mobile device 110 to check for the existence of a DID 117 previously stored on the mobile device 110 and to provide the DID 117 to the identity server 140 if present. The DID 117 may be determined to exist by identifying a DID cookie in a cache of the web browser 116 and/or DID code in LocalStorage of the web browser 116 (by the web browser 116 or the identity server 140) and/or may be determined to exist in other ways, such as by performing the process of FIG. 3E described herein.

If a DID 117 is determined not to be present on the mobile device 110, a DID 117 having a code unique to the mobile device 110 may be generated and stored within the mobile device 110, such as storing the DID 117 within one or more caches of the web browser 116. The mobile device 110 may send a request to the identity server 140 to request the generation of the unique code of the DID 117, and communicate with the identity server 140 to have the DID 117 stored within the mobile device 110. The DID 117 obtained in step 306 (whether a DID 117 generated previous to the latest performance of step 306 or a newly generated and stored DID 117 obtained in the current performance of step 306) may be communicated to the identity server 140.

Step 306 may comprise executing a software code segment to cause mobile device 110 to issue one or more requests to access web pages or other web resources of the identify server 140, such as by a web browser (e.g., 116) of mobile device 110. The software code segment may be an SDK 115 that is embedded within the application 114. The software code segment/SDK 115 may be executed in step 306 as part of the installation of the application 114 onto the mobile device 110 or as part of running the application 114 by the mobile device 110. Thus, running of the application 114 may be skipped in certain implementations of step 306. The software code segment may comprise script 132a provided obtained upon browser 116 accessing web page 132 (HTML document, e.g.) web server 130 and executed by the web browser 116 upon rendering web page (HTML document, e.g.) 132.

In step 308, a software code segment of is executed by the mobile device 110 to send the IFA 113 of the mobile device 110 to the identity server 140. When FIG. 3A is performed by the mobile device 110 as part of a web page access (e.g., web page 132) and implemented by web browser 116 obtaining and executing the software code segment (e.g., script 132a), web browser 116 may not be configured or otherwise be able to obtain the IFA 113 of the mobile device 110 (due to configuration of the web browser 116 and/or OS 112, e.g.). Thus, step 308 may be skipped when the method of FIG. 3A is implemented by a web browser.

The software code segment executed to send the IFA 113 of the mobile device 110 in step 308 may be a software code segment of a downloaded application 114 (e.g., SDK 115) that is executed by the mobile device 110. The IFA 113 and the DID 117 that may be provided as part of step 306 may be sent together at the same time in the same communication (e.g., same packet) to the identity server 140. This software code segment may be part of the same SDK 115 that is embedded within the application 114 or different. The software code segment/SDK 115 may be run in step 308 as part of the installation of the application 114 onto the mobile device 110 or as part of running the application 114 by the mobile device 110. Thus, running of the application 114 may be skipped in certain implementations of step 308. Step 308 may be performed after, before or prior to obtaining the DID 117 from the identity server 140 in step 306. For example, sending the IFA 113 to identity server 140 may be performed as part of the request by the mobile device 110 to the identity server 140 for the DID 117 in step 306.

For example, an API (application programming interface) of the OS 112 may be accessed by the SDK to obtain the IFA 113 which then may be sent to identity server 140. Such an API may be in the form of a software call to obtain the IFA 113 value associated with an IFA pointer providing the memory address of where the IFA 113 is stored within a non-volatile memory of the mobile device 110. After the application 114 obtains the IFA 113, the application may then send the IFA 113 to identity server 140 to allow the identity server 140 to associate the IFA 113 with the DID 117 provided in step 306.

For example, when the mobile device 110 is an iPhone™, the SDK 115 may be run to obtain the IDFA, such as by using the Apple Swift language you would get the IDFA by calling ASIdentifierManager.sharedManager( ).advertisingIdentifier (after importing or linking with AdSupport framework).

FIG. 3B illustrates one example of steps that may be performed by identity server 140 as part of generating a new DID 117 for a mobile device 110 in step 202. In step 310, identity server 140 receives a request from a mobile device 110 for a DID that is not currently assigned to any other mobile device 110. This request may be initiated in response to the mobile device 110 executing SDK 115 via running an application 114 or may be initiated by the mobile device 110 executing script 132a obtained upon accessing a website 130.

In step 312, the identity server 140 identifies a DID code that is not assigned to any mobile device 110. The identity server 140 assigns this unique DID code to the requesting mobile device 110 and reserves this DID code from assignment to other mobile devices 110 that may later request a DID from the identity server 140.

In step 314, the identity server 140 provides the requesting mobile device 110 with the newly assigned DID code 117. The identity server 140 may communicate with the requesting mobile device 110 to cause the assigned DID code 117 to be stored in the requesting mobile device 110. The DID code 117 may be stored in a cache of the web browser 116 of the mobile device 110. In some examples, the identity server 140 sends the newly assigned DID code 117 to requesting mobile device 110 via one or more packets over the network 10 using TCP/IP communication protocol.

In step 316, the identity server may receive the IFA 113 of the requesting mobile device 110. The IFA 113 may be received from the mobile device 110 as part of the request of the mobile device 110 in step 310. The IFA 113 may also be received from the mobile device 110 after the DID code 117 is assigned to the mobile device 110 and the DID code 117 is stored in the look-up table 144a as part of step 318. When the request (step 310) for a DID is initiated by the mobile device 110 in response to browser 116 of the mobile device 110 executing script (such as 132a obtained from accessing web page 132), the browser 116 may be unable to obtain the IFA 113 due to the configuration of the mobile device 110, such as due to the configuration of browser 116 and/or OS 112 of the mobile device 110. Thus, when the request for a DID is initiated by the mobile device 110 in response to browser 116 executing a script, step 316 may be skipped. However, when the request for a DID is initiated by the mobile device 110 in response to application 114 executing an SDK 115, step 316 may be implemented.

In step 318, the identity server 140 updates look-up table 144a of database 144 by creating a new entry in the look-up table 144a to store the DID code 117, and if an IFA code 113 is received (step 316), store and associate the newly assigned DID code 117 and IFA code 113 (represented in hexadecimal format in FIG. 2C). In step 318, the identity server 140 may store both the DID code 117 and IFA code 113 together as part of the creation of a new entry in the look-up table 144a. Alternatively, when a new entry is created in the look-up table 144a, only the DID code 117 may be stored (without any associated IFA 113) in the newly created entry. When the IFA 113 of the mobile device is later identified and obtained (e.g., through execution of SDK 115 of an application 114), the look-up table 144a may be updated to store and associate the IFA 113 with the previously generated and obtained DID 117 of this mobile device.

FIG. 2C illustrates one example of look-up table 144a, comprising a plurality of entries (an entry corresponding to a row in FIG. 2C), with each entry comprising a unique DID code 117 associated with an IFA 113 (or an opt-out code as a DID code for those mobile devices 110 having selected an opted out). The IFA 113 may also be unique to the mobile device 110 and/or unique to the mobile device 110 for IFAs 113 of the same type (e.g., if the IFA 113 is Apple's IDFA, an IDFA code unique among all devices assigned an IDFA). The IFA 113 may be later obtained, and thus some initial entries in the look-up table 144a may not have an IFA 113 stored in the device IFA field, as shown with respect to the entry having a device DID of "AB99". For example, after creating the entry for the device assigned DID "AB99" entries of other mobile devices 110 may be added. Later, the IFA 113 of the mobile device assigned DID "AB99" may be obtained and its entry updated in look-up table 144a by adding the later obtained IFA 113.

The look-up table 144a in FIG. 2C also comprises an entry (e.g., a flag bit) to indicate an opt-out selection of a mobile device 110 associated with the IFA 113 (in this example, opt-out flag bit set to 1 indicates an opt-out, while opt-out flag bit set to 0 indicates no opt-out). In this instance, mobile devices 110 having IFAs 7D7D and 2323 have been identified as having opted out, and thus provided with an opt-out flag of 1 to indicate an opt-out. The entries for IFAs 7D7D and 2323 have thus had their unique DID codes erased, in this instance by setting the Device ID field of these entries in look-up table 144a to the opt-out code (0000 in this example). It should be appreciated that an opt-out code is not a DID 117 and thus not unique to any particular mobile device 110 although it may be obtained and stored in a manner similar to a DID 117.

In step 319, the identity server 140 may store the IFA 113 and/or DID 117 received from the requesting mobile device 110 in step 316 as a cookie (e.g., a first party cookie) in the mobile device 110 (e.g., such as within a standard cache of the web browser 116 of the mobile device 110) or written into another cache of the web browser (e.g., LocalStorage) by the identity server 140 (e.g., with a write command). The IFA 113 and/or DID 117 may be stored as a cookie or in LocalStorage as part of the web browser's 116 access of web pages or other web resources of the identity server 140 in steps 306 and 314 as described below with respect to FIG. 3C. Each of the IFA 113 and/or DID 117 as stored in the requesting mobile device 110 may be encrypted and the key for decrypting the encrypted IFA 113 and/or DID 117 may be stored on the database 144 of the identity server 140. The IFA cookie containing the IFA 113 may also include information to identify the cookie as one storing the IFA 113 (e.g., an IFA cookie), such as information identifying a web page and/or domain of the identity server 140, or some other predetermined or known identifying code. Similarly, the DID cookie containing the DID 117 may have a similar code to identify the cookie as a DID cookie. Similar identifying information may be written and stored with an IFA and/or DID in the web browser's LocalStorage or other cache. The decryption key may be used to decrypt the encrypted IFA 113 when it is later accessed to obtain the original code representing the IFA 113 in a conventional manner. In some implementations, different decryption keys may be generated and used for different IFAs and the decryption key may be stored in a field of an entry of the look-up table 144a of the database 144.

FIG. 3C illustrates one example of providing the DID code 117 and initial storage of the provided DID code 117 in the requesting mobile device 110 that may be performed as part of steps 306 and 314. The DID code 117 has n bits. For purposes of description, the following description provides a 16-bit DID code (i.e., n=16), although the DID code 117 may be implemented in other bit lengths (e.g., 32 or greater, such as 64 or greater). Each bit of the DID code 117 is individually referenced herein by their bit number within the DID code 117, (e.g., DID-bit0, DID-bit1, ... DID-bit15 or as DID-biti (where i=0 to (n−1)) where a bit number of zero (0) is the least significant bit of the DID code 117 and the (n−1)th bit number is the most significant bit of the DID code 117. In this example, the identity server 140 has selected a DID code of 0×0325 (corresponding to the 16 bit binary code of "0000 0011 0010 0101") as a unique and previously unassigned DID code 117 to be assigned to a requesting mobile device 110. Each bit number of the binary DID code may be associated with a different web page (or other web resource accessible by a web browser) of a different domain name). In the example illustrated in FIG. 3D, bit number 0 of the DID code 117 is associated with the web page b0.identity.com/img.jpg (and thus associated with the website having the domain name b0.identity.com) and bit numbers 1 to 15 of the DID code 117 are similarly associated with corresponding web pages of domains b1.identity.com, b2.identity.com, etc., respectively.

At step 320, identity server 140 configures these n web pages to communicate in a selected protocol, here, either unsecure HTTP or HTTPS, where n is the number of bits of the DID code 117 (in this example, n=16). In this example, if the value of DID-biti is equal to 0, the web page http://www.bi.identity.com/img.jpg is configured to communicate via unsecure HTTP. If the value of DID-biti is equal to 1, the web page http://www.bi.identity.com/img.jpg is configured to communicate using the protocol HTTPS and in addition, to provide an HTTP response header to any web browser attempting access via unsecure HTTP. The HTTP response header provided by the HTTPS web site instructs the web browser to retry the connection via HTTPS. The HTTP response header field in this example is named "Strict-Transport-Security" to implement an HSTS (HTTP strict transport security) and contains a field value providing a time period to implement an HSTS policy between the browser and the website. As part of implementing such an HSTS policy, the HTTP response header causes the web browser 116 to update an HSTS cache of the web browser 116 to identify the web site (the domain name) as an HTTPS website so that any future attempts to access the website will be performed using the protocol HTTPS, even if the original instruction to the browser directs the browser to communicate via unsecure HTTP.

Thus, in the example illustrated in FIG. 3D where the obtained unique DID code 117 is 0×0325 (hexadecimal value 0325 having binary code of "0000 0011 0010 0101"), the web pages associated with bit numbers 0, 2, 5, 8 and 9 (each having a bit value of 1) are configured to provide the HTTP response header with a header field name of "Strict-Transport-Security" to direct a web browser access request to communicate with the web page via HTTPS. Such a response header may be referred to herein as an HSTS response header. The value of the field provided with HSTS response header indicates a time period to implement HTTPS communications between the browser and the website. The web pages associated with the remaining bit numbers of the DID code 117 (each having a bit value of 0) are not configured to provide any such HSTS response header to an accessing web browser but instead may be configured to provide content from that web page to an accessing web browser via unsecure HTTP.

In step 322, after configuring the n web pages, identity server 140 instructs requesting mobile device 110 to initiate access of the n web pages (e.g., those illustrated in FIG. 3D) associated with each bit number of the DID code. In step 324, the requesting mobile device 110 sends n requests to access the n web pages with the same protocol, such as n HTTP requests to access the n web pages with an unsecure HTTP protocol. These n HTTP requests result from the mobile device 110 executing SDK 115 provided with application 114 or may result from the mobile device 110 executing script 132a obtained from accessing website 130, for example. As noted herein, these accesses of n web pages need not result in a corresponding rendering by the accessing requesting mobile device 110. In addition, although the example of FIG. 3C refers to access of n web pages, n web resources may be accessed by the requesting mobile device 110 that need not be web pages.

In step 326, for each bit number of the DID code having a bit value of 0 in the newly assigned DID code 117, the web browser 116 of the requesting mobile device 110 may successfully access (via unsecure HTTP, e.g.) the web page (and website) corresponding to this bit number. Each such request may be in the form of an HTTP GET request, e.g. Such access may comprise a download of some content from these web pages. The content may comprise a small amount of image data, such as a single pixel image or an image of 10 pixels or less, or 50 pixels or less, e.g. In some examples, the requesting mobile device 110 need not display or otherwise act on the content downloaded from the web page.

In step 328, for each bit number of the DID code having a bit value of 1 in the newly assigned DID code 117, the web browser 116 of the requesting mobile device 110 receives an HSTS response header from the website corresponding to this bit number in response to the attempt by this web browser 116 to access this website via unsecure HTTP. As noted, the HSTS response header may be an HTTP response header with a field named "Strict-Transport-Security".

In step 330, in response to each HSTS response header received by the web browser 116, the HSTS cache of the web browser 116 of the requesting device is updated. For each website from which an HSTS response header was received, the HSTS cache may store the domain name (e.g., in the form of a domain/host combination) of each website to identify the website (and its web pages) and a flag (which may be referenced herein as an HSTS flag) to instruct the web browser 116 that any future communication with the associated website should be via HTTPS. For example, if the web browser 116 is later directed to access a website via unsecure HTTP and that website is associated with an HSTS flag in the HSTS cache of the web browser 116, the web browser 116 will not perform any communications via unsecure HTTP with this website, but instead communicate via HTTPS with this website.

In step 332, the web browser 116 of the requesting device may successfully access web sites from which an HSTS header response was received via HTTPS protocol. Such access may comprise a download of some content via from the web page of this website. The content may comprise a small amount of image data, such as a single pixel image or an image of 10 pixels or less, or 50 pixels or less, e.g.

FIG. 3E illustrates an exemplary method for obtaining the DID 117 from a mobile device 110 that may be performed as part of step 210 (and as part of checking for the existence (e.g., previous storage) of a DID 117 on a mobile device 110 as described herein, such as in step 202). In step 340, web browser 116 of the mobile device 110 is instructed to access via unsecure HTTP each of the n websites associated with each of the n bit numbers of the DID code 117. Continuing with the example provided with respect to FIGS. 3C and 3D, the web browser 116 of the mobile device 110 may be instructed to access via unsecure HTTP each of the sixteen web pages www.bi.identity.com/img.jpg for i=0 to n (in this example, 0 to 15, but may be 32 or more, such as 64 or more). The instructions to access these n websites may be provided by various sources, such as via script 132a or 182a provided via website access by the web browser 116 (e.g., via web pages 132 or 182). Alternatively, these instructions to access these n websites may be provided by running SDK 115 (provided with application 114) run as part of installing the application 114 or running the application 114. In this example, the n websites are hosted by the identity server 140 and the DID 117 is thus obtained by the identity server 140. However, it will be appreciated that the n websites may be hosted by another server (e.g., web server 130) and the DID 117 may be obtained by that server.

In step 342, identity server 140 monitors the web browser's 116 incoming requests to access each of the n web pages (or other type of web resource) and determines if each of these requests is performed via unsecure HTTP or HTTPS.

In step 344, the DID code 117 is obtained by associating bit values of "0" with unsecure HTTP requests and bit values of "1" with HTTPS request. Specifically, since the instructions provided in step 340 are to access each of the n web pages via unsecure HTTP, any corresponding request from web browser 116 communicated via HTTPS to one of the n websites is determined to be a result of an HSTS flag in the HSTS cache of the web browser 116. The identity server 140 thus provides a bit value of "1" for each of the bit number(s) of the DID code associated with those website(s) receiving such requests via HTTPS. For any such corresponding request from the web browser 116 that is performed via unsecure HTTP (or not via HTTPS) to the n websites, the identity server 140 may conclude there is no HSTS cache entry in the requesting web browser 116 that associates an HSTS flag and the corresponding website. The identity server 140 may thus provide a bit value of "0" for each of the bit number(s) of the DID code 117 associated with those website(s) receiving such requests via unsecure HTTP. The identity server 140 may thus obtain the DID code 117 in full after all n websites receive an access request from the web browser 116.

Figure 4A:
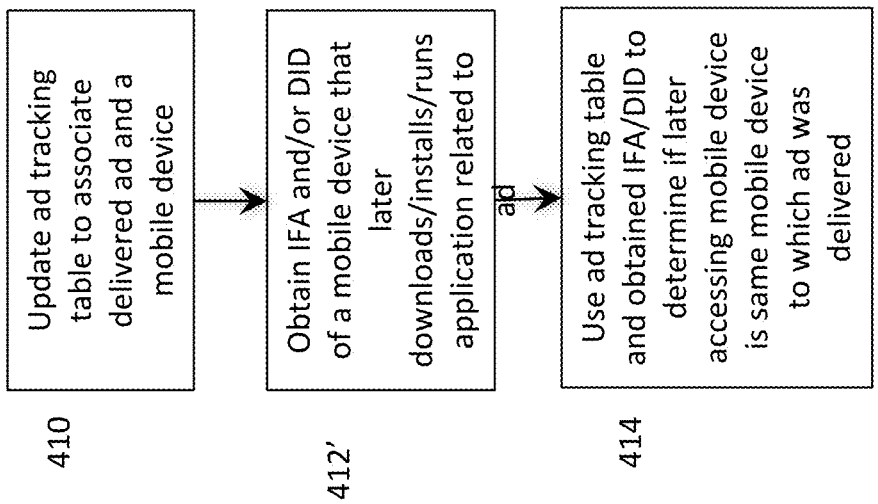

FIG. 4A illustrates one example of ad tracking that may be performed as part of step 218. In step 410, an ad tracking table is updated in to associate an advertisement with a mobile device in response to delivering an advertisement to web server 130 (e.g., for subsequent delivery to the accessing mobile device 110 as performed in step 216). An exemplary ad tracking table 154a is illustrated in FIG. 2B. The following description refers to the ad tracking table 154a being stored and updated by ad server 150, however, the ad tracking table 154a may be stored and maintained elsewhere, such as with identity server 140 (e.g., when identity server 140 both obtains a corresponding IFA 113 in response to an obtained DID 117—either directly from the mobile device 110 or from a web server (e.g., 130)—and using the obtained IFA 113 to obtain and provides the advertisement to the mobile device 110). In this example, the ad server 150 updates the ad tracking table 154a to add an entry (a row in the exemplary ad tracking table 154a of FIG. 2B) to associate the delivered advertisement to the accessing mobile device 110 as identified by its IFA 113 and/or DID 117. For example, the ad server 150 may store in an entry of an ad tracking table 154a stored in database 154 (and thereby associate) one or more of an advertisement id (e.g., a unique id identifying the advertisement), the date and/or time of delivering the advertisement, the IFA 113 of the accessing mobile device 110, the DID 117 of the mobile device 110, and a vendor id identifying the vendor associated with the delivered advertisement.

After delivery of the advertisement to the accessing mobile device 110, and the associated updating of the ad tracking table 154a, the IFA and/or DID of a mobile device accessing a website is obtained (step 412). If the same mobile device 110 accesses a vendor web page 182 that is associated with the advertisement (e.g., the vendor associated with the vendor id), the IFA 113 and/or DID 117 may be obtained from the mobile device 110 (as described with respect to steps 204 to 214) by the vendor server 180.

In step 414, the ad tracking table 154a and obtained IFA/DID are used to determine if the later accessed web page in step 412 is the same as the mobile device to which the ad was delivered (in connection with step 410). Specifically, the IFA 113 and/or DID 117 of the mobile device 110 accessing the vendor web page 182 (obtained in step 412) may be compared with those stored in the ad tracking table 154a (step 410) to find any matches and thereby determine the effectiveness of the advertisement. For example, when the IFA 113 and/or DID 117 of the mobile device 110 accessing the vendor web page 182 matches those in an entry of the ad tracking table 154a and the vendor id in that entry is associated with the vendor web page 182, the vendor may conclude that the associated advertisement (as identified by the advertisement id in that entry) was successful. The difference of the time of the delivery of the advertisement and the time of the same mobile device 110 accesses the vendor web page 182 may also be analyzed to determine the effectiveness of the associated advertisement.

It should be appreciated that such an ad tracking table 154a may be created and stored for a particular vendor, such as on vendor server 180. Also, more or less information may be tracked. For example, advertisement ids may be associated with later accessed web pages (e.g., 182) and a vendor id need not be stored. For example, identifying the mobile device 110 by its IFA 113 may be sufficient for ad tracking purposes and a DID 117 need not be stored by the ad tracking table 154a (or alternatively, only the DID 117 may be stored and the IFA 113 need not be stored).

Figure 4B:
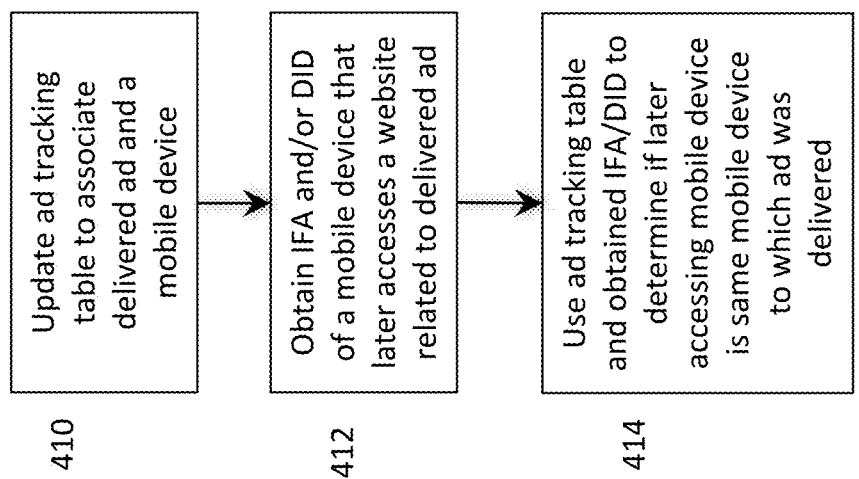

FIG. 4B illustrates another example of ad tracking that may be performed as part of step 218 (in addition to or instead of those described with respect to FIG. 4A). Steps 410 and 414 may be the same as that described with respect to FIG. 4A. In this example, the ad tracking table 154a may be used to identify advertisements responsible for user downloads of applications 114 on a mobile device 110. For example, in step 412' mobile devices 110 that download and install a vendor's application 114 may provide their IFA 113 to the vendor server 180 or ad server 150. As part of a purchase or download of an application, or as part of the installation of an application 114 on a mobile device 110, or the running of an application 114 on a mobile device 110, the mobile device 110 may be instructed by the application 114 to provide its IFA 113 to this server (e.g., 180, 150). In addition, or alternatively, this server (180, 150) may obtain the DID 117 of the mobile device 110 (as performed in step 210) and send a request to the identity server 140 to obtain the corresponding IFA 113 from look-up table 154a of identity server 140 (as described herein). Such provision of the IFA 113 and/or DID 117 may be performed upon execution of the SDK 115 as part of the installation and/or running of the downloaded application 114.

The thus obtained IFA 113 and/or DID 117 may then be compared to those in the ad tracking table 154a to determine if there is a match (step 414). For example, when the ad tracking table 154a is maintained in the database 154 of the ad server 150, a vendor server 180 may obtain an IFA from an application 114 as part of running the application 114 on a mobile device, and provide the obtained IFA 113 (and/or DID 117) to the ad server 150 (e.g., SDK 182a may be responsible for providing the obtained IFA 113 and/or DID 117 to the ad server 150 when such information is provided to vendor server 180). Ad server 150 may then perform analysis to determine if there is match between the IFA 113 received from the vendor server 180 and an entry in the ad tracking table 154a including this IFA 113 in a field of the entry. Determining that a match exists may require both matching of the IFA 113 and/or DID 117 with an entry in the ad tracking table 154a as well as confirming that the matching entry in the ad tracking table 154a contains a vendor id associated with the vendor associated with the downloaded application (which may be the same as the vendor of the vendor serve 180). Results of this analysis may be communicated to the vendor (e.g., from the ad server 150 to the vendor server 180). If a match is found, the vendor may conclude the advertisement (identified by the advertisement id in the ad tracking table 154a) provided to the corresponding mobile device 110 was successful. The difference of the time of providing the advertisement (optionally stored with the entry in the ad tracking table) and the time the downloaded application 114 provides the IFA and/or DID 117 of the mobile device to the vendor's server 180 may also be analyzed to determine the effectiveness of the advertisement.

In step 214 of FIG. 4A and FIG. 4B, correlating the later accessing mobile device to the delivered ad may be performed after correlating the IFA 113 and DID 117 of a particular mobile device. For example, ad tracking table 154a may only store a DID 117 and leave an IFA field empty, such as done for the entry having device DID "AB99" in the exemplary ad tracking table 154a of FIG. 2B. Similarly, the ad tracking table 154a may include entries having no data for the device DID field and only the IFA 113 entered (in the device IFA field). Later, the IFA 113 may be obtained and associated with the DID 117 of a particular mobile device 110 and the ad tracking table 154a may be updated and analyzed to correlate the actions of a later accessing mobile device (e.g., purchase, vendor website access, signing up, etc.) with the delivered ad. Such actions of an accessing mobile device 110 may also be stored and correlated with one or more of the IFA 113 and DID 117 of the accessing mobile device 110, such as by a vendor upon the later interaction with the mobile device (e.g., vendor website 182 access by the browser 116 of the mobile device 110), where the IFA 113 and/or DID 117 are obtained by the vendor server 180 as described herein.

FIG. 2D illustrates exemplary repetition of the method of FIG. 2A with respect to a particular accessing mobile device 110. Although the processes of FIG. 2D are described with respect to particular mobile device 110, it will be understood that multiple different mobile devices 110 implement the process and be configured to implement the process of FIG. 2D. The flow chart process of FIG. 2A is duplicated in FIG. 2D, although all the steps of FIG. 2A are not explicitly illustrated in FIG. 2D. Specifically, the process of FIG. 2D illustrates steps 202 and 204 of FIG. 2A and represents the remaining steps 206 to 222 and possible sequences (including optional implementations and alternatives) as box 206-222. Node 216-218 of FIG. 2D represents the process of FIG. 2A after performing either step 216 or step 218 (as noted herein, like other exemplary steps or portions thereof described herein, step 218 is optional). After performing step 216 or step 218, the process of FIG. 2A may be repeated, starting at step 204 when the web browser 116 of the accessing device performs another access of a web page 132 (which may be the same or different from web pages 132 previously accessed). The generation of a device DID 117 need not be repeated unless it is determined that the mobile device no longer has a device DID (which may be determined as part of the web browser's execution of the script downloaded from the newly accessed web page).

The method of FIG. 2D thus comprises repeatedly performing the process described with respect to FIG. 2A starting at step 204 and ending at step 216 or 218 (e.g., repeating Loop A and/or Loop B of FIG. 2D). The initial step of FIG. 2D comprises generating the device DID and updating look-up table 144a as described herein with respect to step 202. As described herein, step 202 may be performed by generating the DID 117 by executing script on a browser 116 where the script is provided to the browser 116 by a web page. In this instance, the IFA 113 may not be available as the web browser 116 may not be configured to obtain the IFA 113 of the mobile device 110. Loop A of FIG. 2D represents the process of FIG. 2A as executed by the system and devices thereof when an IFA 113 of the accessing mobile device 110 has not yet been obtained. Loop A may be repeated for each access of a web page (which may be different web pages 132 hosted by different web servers 130 or other servers) by mobile device 110.

As also described herein, step 202 may be performed by generating the DID 117 by executing SDK 115 providing with application 114. In such an instance, the SDK 115 may operate to obtain the IFA 113 of the mobile device 110. In this instance, the process of FIG. 2D/FIG. 2A may continue by obtaining and using the IFA 113 as described herein. Such process may be repeated for each subsequent access of a web page 132 by the web browser 116 of the accessing mobile device 110 (again, each such accessed web page 132 need not be the same web page 132 and may be different from each other). Loop B of FIG. 2D represents the repeated process of FIG. 2A as executed by the system and devices thereof when an IFA 113 has been obtained and associated with a DID 117 (e.g., in look-up table 144a).

It will be appreciated that although Loop A of FIG. 2D comprises step 204 and the remainder of the flow chart of FIG. 2A as it pertains to steps 206-222, only some of steps 206-222 may be implemented in any one pass of executing the method of FIG. 2A (and thus FIG. 2D), as described herein, and further, that some of steps 206-222 may be omitted entirely from the implementation of the method of FIG. 2A (and thus FIG. 2D), as described herein.

In addition, FIG. 2D may be implemented by first implementing Loop A one or more times (without having obtained an IFA 113 from the mobile device 110), then obtaining an IFA from the mobile device 110 in step 203, and then repeating Loop B after obtaining the IFA 113 in step 203. In this instance, when implementing Loop A, look-up table 144a may be updated in step 202 to only include the DID 117 and ad tracking table 154a may be updated in step 218 to add entries without providing an IFA 113 in the IFA field of the entry (although such entries may include a DID 117). For example, entries associated with DID 117 having a code of AB99 in ad tracking table 154a (FIG. 2B) and look-up table 144a (FIG. 2C) have no value entered in the field provided for the IFA in these tables (alternatively, a predetermined code, such as "FFFF" or a flag bit of the entry may indicate the lack of an IFA for a particular entry in table 144a and/or 154a). After accessing one or more web pages 132 (e.g., at step 204) and performing loop A one or more times, the mobile device may execute SDK 115 in an application 114, as described herein with respect to step 202. Upon executing the SDK 115, the IFA 113 of the mobile device 110 may be obtained and both the newly obtained IFA 113 and the previously obtained DID 117 may be provided to identity server 140 to update the look-up table 144a. In addition, the IFA 113 and the previously obtained DID 117 may be provided to the server or servers maintaining the ad tracking table 154a (such as ad server 150 and/or identity server 140). SDK 115 may first check for the existence of a DID stored on the mobile device 110 (e.g., existence of a DID cookie, DID in LocalStorage, and/or communicate with identity server 140, as described herein) so that new DID 117 need not be generated upon determining the existence of the DID 117 within the mobile device 110. At this time, each of the look-up table 144a and ad tracking table 154a may be updated to add the obtained IFA 113 in the appropriate IFA field of the entries of these tables having the DID 117. Thus, although initial operations of Loop A may be unable to identify a mobile device 110 by its IFA 113, later actions of the mobile device 110 may allow the IFA 113 to be obtained and associated with earlier performed actions of the mobile device 110.

Figure 5:
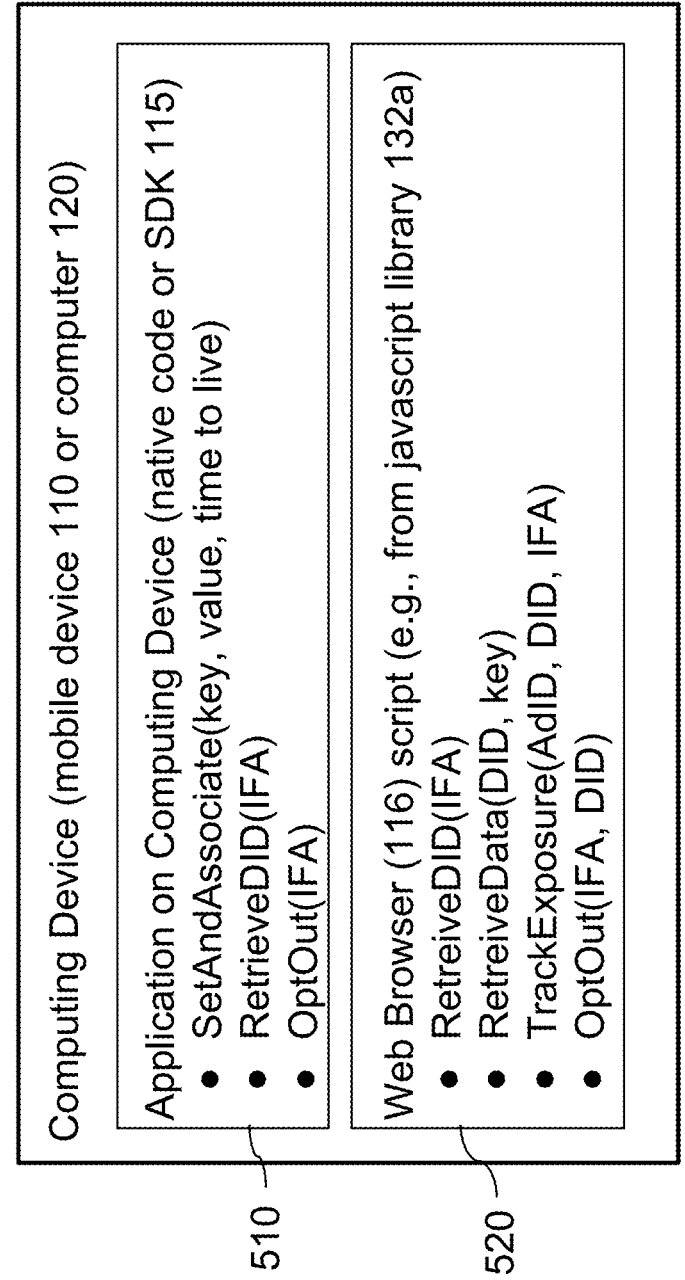
FIG. 5 illustrates exemplary calls to software routines to perform various aspects of the steps of described with respect to FIGS. 2A-2D, 3A-3E, 4A and 4B.

FIG. 5 illustrates exemplary calls to execute software routines 510 and 520 on a computing device, such as the mobile device 110 or computer 120. Software routines 510 and 520 (and/or other software routines) may be executed by and configure the computing device 110, 120 as part of performing the methods described herein, e.g., with respect to FIGS. 2A-2D, 3A-3E, 4A and 4B, and thus the exemplary details described with respect to these figures may not be fully repeated below but should be considered applicable to these software routines 510, 520. Software subroutines 510 may be provided by a downloaded application 114 on the mobile device 110 and be embedded in the application 114 as SDK 115. The SDK 115 of application 114 may include several APIs (application programming interfaces) represented in FIG. 5 as calls "SetAndAssociate(key, value, time to live)," "RetrieveDID(IFA, DID)," and "OptOut(IFA)." Software subroutines 520 may be provided to the device 110, 120 and configure the web browser 116 of the device 110, 120. The subroutines 520 may be obtained from a JavaScript™ library (e.g., LIB.js 132a) upon the device 110, 120 accessing a web page (e.g., 132) providing the script 132a of the JavaScript™ library. The script obtained by the device 110, 120 may include several software routines associated with calls "RetrieveDID(IFA, DID)," "RetrieveData(DID, IFA)," "TrackExposure(AdID, DID, IFA)" and "OptOut(IFA, DID)."

Upon execution of SetAndAssociate(key, value, time to live) of 510, the variable name passed with the field "key" is associated with a code "value". For example, SetAndAssociate "IFA", value, time to live) causes the computing device (e.g., either mobile device 110 or other computer device 120, referenced generically as "110, 120") to obtain the code associated with variable "IFA" of the device 110, 120 from the OS of the device 110, 120 (e.g., causing a request to the OS for the IFA code via an API of the OS) and send the same to identity server 140; determine if a DID 117 is stored on the device 110, 120 (as described herein, e.g., by causing web browser 116 to identify any DID cookie stored in a cache of the web browser 116 and/or analyzing data stored in the LocalStorage cache of the web browser 116 and/or causing the identity server 140 to analyze web site accesses of the device 110, 120); if a DID 117 is found to have been previously stored on the device, this DID 117 is obtained by the identity server 140 (as described herein, e.g., either by transmission from the device 110, 120, through monitoring web site accesses of the device 110, 120, etc.); if a DID 117 is not found to have been previously stored on the device, a new unique DID code 117 is obtained by server 140 and stored on device 110, 120 (e.g., as described herein); server 140 having been provided the IFA 113 and a DID 117 (previously stored or newly obtained) of device 110, 120, associated the same (e.g., by storing the same as IFA 113 and DID 117 in look-up table 144a). The actions described herein regarding the SetAndAssociate API may be performed after checking for whether the device 110, 120 has opted out or not, as described herein. It should also be appreciated that the identification of the variable name passed with the key field of the SetAndAssociate command may be "UIDH" (as identified by an iOS 112 in an Apple™ iPhone™) to identify the IFA 113 of an Apple iPhone, such as described herein. In other implementation, values of other variables may be associated with the SetAndAssociate command by passing known variable names rather than those associated with an IFA.

Upon execution of RetrieveDID(IFA) of 510, the device 110, 120 obtains its DID 117 by providing this request with the IFA code (the IFA code first having been obtained from a request to the device OS) to the identity server 140. The identity server 140 in response thereto provides the DID code associated with the provided IFA (e.g., as stored in the same entry in look-up table 144a).

Execution of OptOut(IFA) of 510 may cause the device 110, 120 to instruct the identity server 140 to identify the device associated with the IFA transmitted to the server 140 as opted-out and to perform cleanup actions as described herein.

Execution of RetrieveDID(IFA) of 520 obtains the DID 117 of the device 110, 120. If the DID 117 is available in a DID cookie or in LocalStorage, the web browser 116 of the device 110, 120 may obtain the DID 117 (which may or may not require communication with server 140, such as requesting decryption of an encrypted DID found in a DID cookie or in LocalStorage). If available (such as in a IFA cookie), the IFA 113 may be passed to the server 140 so that the web browser 116 may obtain the DID 117 from the identity server 140 (via look-up table 144a, e.g.). If no IFA or DID is found from information read from a cache of the web browser 116 (e.g., storing a cookie or LocalStorage) is found on the device 110, 120, the RetrieveDID subroutine of 520 may then request the identity server 140 obtain the DID 117 (e.g., by monitoring web site accesses of the device 110, 120) and return the DID 117 value in response thereto (as described herein). In some examples, the web browser 116 may be unable to obtain the IFA 113 from the OS 112. In addition, RetrieveDID(IFA) of 520 may be used as part of SetAndAssociate of 510 as a command to cause the DID 117 to be obtained by server 140 monitoring accesses of web sites of the server 140 by the device 110, 120.

Execution of RetrieveData(DID, key) of 520 may provide a RetrieveData request to identity server 140 to cause the identity server 140 to identify the IFA 113 associated with the DID passed to the server 140 with the RetrieveData request from the device 110, 120 (or a DID 117 otherwise obtained by the server 140). The identified IFA 113 may be returned to the device 110, 120 or used by the identity server 140 as part of an ad call from the web browser 116 (and the IFA 113 obtained by RetrieveData(DID, key) need not be returned to the device 110, 120).

Execution of TrackExposure(AdID, DID, IFA) of 520 subroutine may cause an identification code (AdID) received with an advertisement being received and rendered by the web browser 116 to be sent to an external server (e.g., identity server 140 or ad server 150 containing an ad track table, such as 154a) along with the DID 117 and/or IFA 113 of the device 110, 120. Such a TrackExposure request from the device 110, 120 to the external server (e.g., identity server 140) may cause updating of the ad tracking table 154*a* to store this information in an entry of the ad tracking table 154*a*. Date and Time may also be added to this entry, either based on the time of receiving the TrackExposure request by the server, or by sending date and time associated with the receipt and rendering of the advertisement by the web browser 116 with the TrackExposure request. As noted herein, in some implementations, only one of the IFA 113 and DID 117 need be sent and the other of the IFA 113 and DID 117 may be obtained from look-up table 140 from identity server 144*a*.

Execution of OptOut(IFA, DID) of 520 causes an OptOut request to be sent to identity server 140 with one or both of the IFA 113 and DID 117, to thereby cause identity server 140 to update the look-up table 144*a* to associate the device 110, 120 as being opted out and perform any cleanup actions as described herein.

In further examples, the system of FIG. 1 may be configured to perform fraud detection. Fraud detection may be performed instead of steps 216 and 218 or in addition to step 216 or both of steps 216 and 218 in FIGS. 2A/2D. For example, an application 114 of a mobile device embedded with SDK 115 may be configured to execute the SetAndAssociate subroutine described herein upon any initial execution of the application 114 or periodically during the execution of the application 114 (e.g., every 10 minutes, every hour, etc.). The SetAndAssociate request from the device 110, 120 thereby provides both the IFA 113 and the DID 117 of the device 110, 120 and updates look-up table 144*a*. Optionally, if an entry already exists in the look-up table 144*a* associating IFA 113 and DID 117, updating the look-up table 144*a* may be skipped and the SetAndAssociate subroutine terminated. Alternatively, an entry may be added to the look-up table 144*a* even if a previous entry associating the obtained IFA 113 and DID 117 exists. In some implementations, the entries may be identical or may differ based on other information stored in additional fields of the entry (and received with the SetAndAssociate request, such as time of receipt of the SetAndAssociate request and an application ID (unique to application 114 to identify application 114 containing the SDK 115 which executed the SetAndAssociate call to generate the SetAndAssociate request received by identity server 140).

The look-up table 114*a* of may later be analyzed to examine all entries having the same DID code. For these entries, if the associated IFA 113 is different for the same DID code, and the IFA 113 is altered to a different IFA 113 at a frequency above a certain threshold (e.g., more than once every hour or altered every time the application 114 is run), it may be determined that the device 110, 120 is associated with fraud. For example, application developers may receive revenue upon determining that an application was downloaded onto a device 110, 120, which is often determined only upon running of the application 114 associated with a new IFA (previously unassociated with running of the application). As the IFA of a device 110, 120 may be changed by a user, credit for a newly downloaded application 114 may erroneously be given to a developer. While this may occur infrequently (and thus be acceptable) for typical IFA modification by a typical user, higher frequency alterations of the IFA (as may be detected with this implementation) indicate abnormal usage of the device 110, 120 and may be associated with fraud.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims.

What is claimed is:

1. A method of accessing a web resource by a computer, comprising:
   obtaining via an operating system (OS) of the computer an identifying code for advertisers (IFA);
   executing a first application on the computer, the first application including instructions to initiate an ad call comprising a request including the IFA to cause the first application to render an advertisement received by the computer from a first web resource in response to the ad call;
   by a web browser on the computer, executing a first script to configure a cache with a durable id (DID) code, the DID code being different from the IFA, executing the first script causing the web browser to perform a plurality of access requests to a first plurality of web resources identified in the first script; and
   causing the web browser to communicate the DID code to associate the IFA with the computer,
   wherein the DID code is formed of n portions of equal bit-length, and
   wherein the cache comprises n entries that each associate a corresponding one of the n portions of the DID code and an associated one of the first plurality of web resources.

2. The method of claim 1, further comprising executing a web browser application to access a second web resource and to download the first script from the second web resource.

3. The method of claim 1, wherein executing the first application includes instructing the web browser to execute the first script.

4. The method of claim 1, wherein the first plurality of web resources are identified in the first script by different corresponding domain names.

5. The method of claim 1, wherein the web browser application is configured to be unable to obtain the IFA via requests to the OS.

6. The method of claim 1, wherein the computer is a mobile device, and wherein communications with the first web by the computer include wireless communications using a redo of the mobile device.

7. The method of claim 1, wherein executing the first application on the computer comprises the first application obtaining the IFA via a request to the OS.

8. The method of claim 7, wherein the web browser application is configured to be unable to obtain the IFA via requests to the OS.

9. The method of claim 1, wherein each of the n entries of the cache comprise a first field and a second field to respectively store a different corresponding one of the n portions of the DID code and the corresponding associated one of the first plurality of web resources.

10. The method of claim 1, wherein the DID code has a predetermined bit-length.

11. The method of claim 1, wherein the DID code is unique to the computer to identify the computer.

12. The method of claim 1, wherein executing the first script by the browser automatically causes the initial association of the DID code with the computer.

13. The method of claim 12, wherein the DID code is unique to the computer.

14. The method of claim 1, wherein the DID code is unique to the computer.

15. The method of claim 1, wherein the cache is a HTTP strict transport security ("HSTS") cache.

16. The method of claim 1, wherein both the first application and the web browser are configurable with the first script to generate the DID upon execution of the first script by the first application or the web browser.

17. A computer. comprising at least one processor and memory, configured with software to perform the steps of:
   obtaining via an operating system (OS) of the computer an identifying code for advertisers (IFA);
   executing a first application on the computer, the first application including instructions to initiate an ad call comprising a request including the IFA to cause the first application to render an advertisement received by the computer from a first web resource in response to the ad call;
   by a web browser on the computer, executing a first script to configure a cache with a durable id (DID) code, the DID code being different from the IFA, executing the first script causing the web browser to perform a plurality of access requests to a first plurality of web resources identified in the first script; and
   causing the web browser to communicate the DID code to associate the IFA with the computer,
   wherein the DID code is formed of n portions of equal bit-length, and
   wherein the cache comprises n entries that each associate a corresponding one of the n portions of the DID code and an associated one of the first plurality of web resources.

18. The computer of claim 17, wherein the computer is a mobile phone including a radio configured to perform wireless communications to implement communications with the first web resource.

19. A non-transitory computer readable medium comprising software code to configure a computer to perform the steps of:
   obtaining via an operating system (OS) of the computer an identifying code for advertisers (IFA);
   executing a first application on the computer, the first application including instructions to initiate an ad call comprising a request including the IFA to cause the first application to render an advertisement received by the computer from a first web resource response to the ad call;
   by a web browser on the computer, executing a first script to configure a cache with a durable id (DID) code, the DID code being different from the IFA, executing the first script causing the web browser to perform a plurality of access requests to a first plurality of web resources identified in the first script; and
   causing the web browser to communicate the DID code to associate the IFA with the computer,
   wherein the DID code is formed of n portions of equal bit-length, and
   wherein the cache corn rises n entries that each associate a corresponding one of the n portions of the DID code and an associated one of the first plurality of web resources.

* * * * *